US012369508B2

(12) United States Patent
Morimoto et al.

(10) Patent No.: US 12,369,508 B2
(45) Date of Patent: Jul. 29, 2025

(54) TRAVEL LINE CREATION SYSTEM FOR AGRICULTURAL MACHINE

(71) Applicant: KUBOTA CORPORATION, Osaka (JP)

(72) Inventors: Takanori Morimoto, Sakai (JP); Ryota Kikuchi, Sakai (JP); Kenji Tamatani, Sakai (JP); Fumiya Yoshimura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 274 days.

(21) Appl. No.: 18/121,636

(22) Filed: Mar. 15, 2023

(65) Prior Publication Data

US 2023/0225237 A1  Jul. 20, 2023

Related U.S. Application Data

(63) Continuation of application No. PCT/JP2021/034093, filed on Sep. 16, 2021.

(30) Foreign Application Priority Data

Sep. 17, 2020 (JP) .................... 2020-156723

(51) Int. Cl.
*A01B 69/00* (2006.01)
*A01B 69/04* (2006.01)
*G05D 1/00* (2006.01)

(52) U.S. Cl.
CPC ......... *A01B 69/008* (2013.01); *G05D 1/0219* (2013.01)

(58) Field of Classification Search
None
See application file for complete search history.

(56) References Cited

U.S. PATENT DOCUMENTS 9,795,074 B2   10/2017  Stratton et al.
2005/0197757 A1*  9/2005  Flann ............... G05D 1/0219
                                                   701/50

(Continued)

FOREIGN PATENT DOCUMENTS

EP   3508045 A1    7/2019
JP   11-266608 A   10/1999

(Continued)

OTHER PUBLICATIONS

Official Communication issued in corresponding European Patent Application No. 21869418.0, mailed on Sep. 16, 2024, 11 pages.

(Continued)

*Primary Examiner* — Truc M Do
(74) *Attorney, Agent, or Firm* — Keating & Bennett, LLP

(57) ABSTRACT

A travel line creation system for an agricultural machine, includes a position acquirer to acquire position measurement points for the agricultural machine, a display, a first generator to associate the position measurement points with a field displayed by the display and generate creation points on the field by shifting the position measurement points inward in an agricultural field, a second generator to create a travel line including a loop which passes through the creation points and calculate each of virtual lines by connecting together adjacent ones of the creation points, and a setter to extract a pair of virtual lines adjacent to each other and extending in different directions and set, as a work point regarding a breakpoint in work performed by a working device, one of the creation points shared by the extracted pair of virtual lines.

9 Claims, 19 Drawing Sheets

(56) References Cited

U.S. PATENT DOCUMENTS

| | | | |
|---|---|---|---|
| 2008/0103690 A1 | 5/2008 | Dix | |
| 2008/0215203 A1* | 9/2008 | Dix | G05D 1/0219 |
| | | | 701/26 |
| 2011/0106422 A1* | 5/2011 | Gould | A01B 69/001 |
| | | | 701/533 |
| 2018/0321683 A1 | 11/2018 | Foster et al. | |
| 2019/0146513 A1* | 5/2019 | Tomita | A01B 69/008 |
| | | | 701/50 |
| 2021/0267115 A1* | 9/2021 | Fjelstad | G05D 1/0257 |

FOREIGN PATENT DOCUMENTS

| | | |
|---|---|---|
| JP | 2006-204174 A | 8/2006 |
| JP | 6592367 B2 | 10/2019 |
| JP | 2020-099249 A | 7/2020 |
| JP | 2020-113121 A | 7/2020 |
| JP | 6748007 B2 | 8/2020 |

OTHER PUBLICATIONS

Official Communication issued in International Patent Application No. PCT/JP2021/034093, mailed on Nov. 2, 2021.

\* cited by examiner

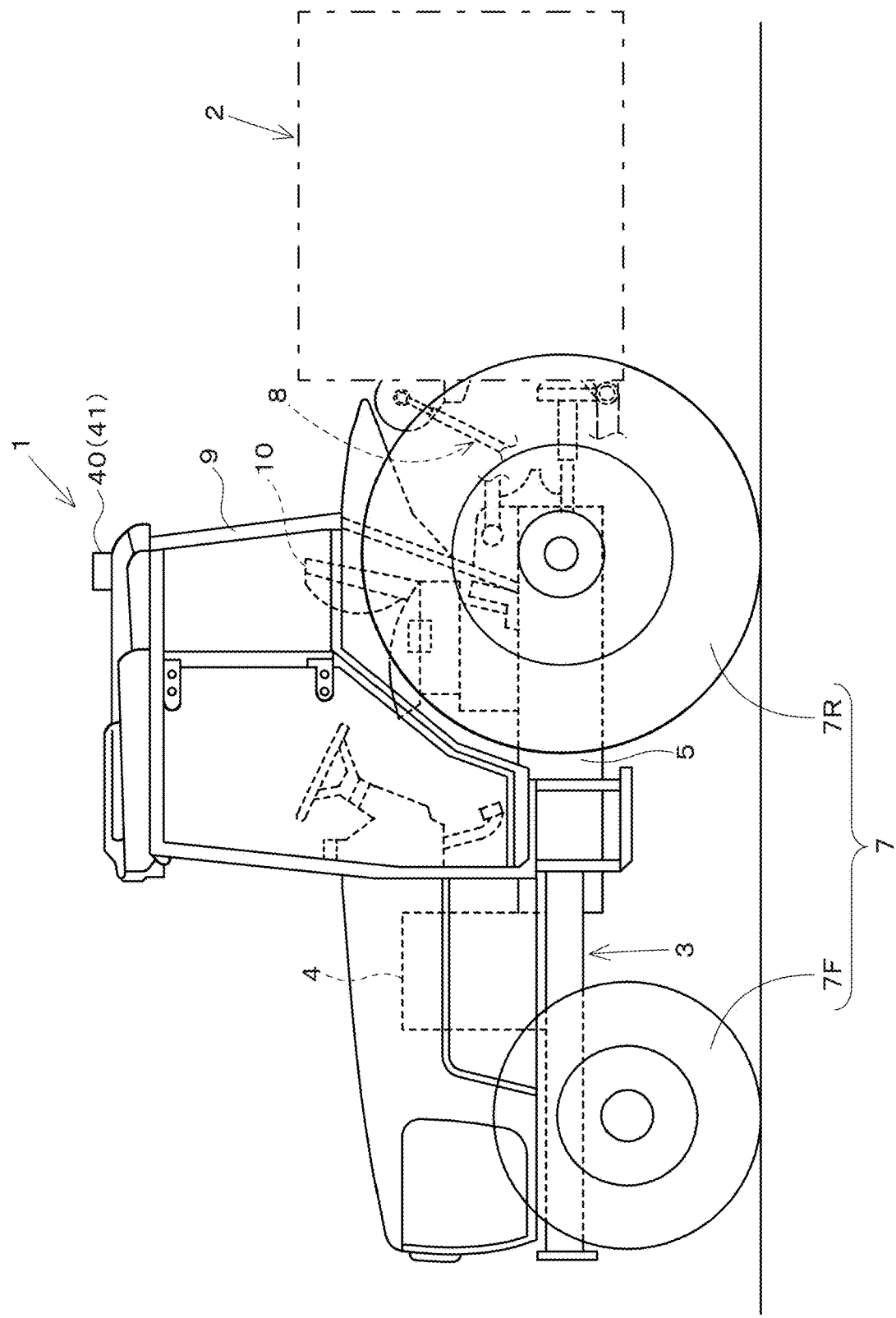

TRAVEL LINE CREATION SYSTEM FOR AGRICULTURAL MACHINE

CROSS REFERENCE TO RELATED APPLICATIONS

This application is a continuation application of International Application No. PCT/JP2021/034093, filed on Sep. 16, 2021, which claims the benefit of priority to Japanese Patent Application No. 2020-156723, filed on Sep. 17, 2020. The entire contents of this application are hereby incorporated herein by reference.

BACKGROUND OF THE INVENTION

1. Field of the Invention

The present invention relates to a travel line creation system for an agricultural machine such as a tractor.

2. Description of the Related Art

As disclosed in Japanese Unexamined Patent Application Publication No. 2006-204174, when an agricultural machine to which a transplanter is attached as a working device performs planting work in an agricultural field, the agricultural machine travels back and forth and performs planting in an inner area with a headland of the agricultural field left unplanted and then travels and performs planting in the headland surrounding the inner area.

SUMMARY OF THE INVENTION

However, depending on a positional relationship between a work start point where the transplanter starts the planting work, a work end point where the transplanter ends the planting work, etc., and the entrance/exit of the agricultural field, the agricultural machine may travel to a place where the planting work has already been done when the agricultural machine moves out of the agricultural field or moves to another place after the completion of traveling and planting in the headland area surrounding the inner area.

Preferred embodiments of the present invention provide travel line creation systems for agricultural machines that each enable the agricultural machine, when the agricultural machine performs work while traveling along a travel line surrounding the inner area of an agricultural field and moves out of the agricultural field or moves to another place or the like, to avoid traveling a place where the work has already been performed.

A travel line creation system for an agricultural machine according to an aspect of an example embodiment of the present invention includes a position acquirer to acquire position measurement points obtained when the agricultural machine to which a working device is attachable makes a round in an agricultural field, a display to display a field that represents the agricultural field, a first generator to associate the position measurement points with the field displayed by the display and generate creation points on the field by shifting the position measurement points inward in the agricultural field, a second generator to create a travel line including a loop which passes through the creation points generated by the first generator and calculate each of virtual lines by connecting together adjacent ones of the creation points on the travel line, and a setter to extract, from the virtual lines generated by the second generator, a pair of virtual lines adjacent to each other and extending different directions and set, as a work point regarding a breakpoint in work performed by the working device, one of the creation points that is shared by the extracted pair of virtual lines.

If there are a plurality of the pairs of virtual lines, the setter may extract a particular pair of virtual lines defining an angle not less than a criterion value from the plurality of pairs of virtual lines, and set, as the work point, one of the creation points that is shared by the extracted particular pair of virtual lines.

If there are candidates for the work point, the setter may extract a particular pair of virtual lines defining an internal angle less than about 180° from a plurality of the extracted pairs of virtual lines, and set, as the work point, one of the creation points that is shared by the extracted particular pair of virtual lines.

If there are candidates for the work point, the setter may set, as the work point, one of the candidates that is nearest to an entrance-and-exit of the agricultural field.

The second generator may set, as the travel line, a headland work line to perform work on a headland of the agricultural field.

The setter may set a work start point, a work end point, a pause point, or a work preparation point of the working device as the work point.

The second generator may generate, as a plurality of the travel lines, paths adjacent to each other in a direction from a central portion of the field outward. The setter may set, respectively for the paths adjacent to each other, a plurality of the work points at different positions in a direction in which the paths extend.

An agricultural machine includes the above-described travel line creation system for an agricultural machine.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 13 is a side overall view of the agricultural machine.

DETAILED DESCRIPTION OF THE PREFERRED EMBODIMENTS

Figure 1:
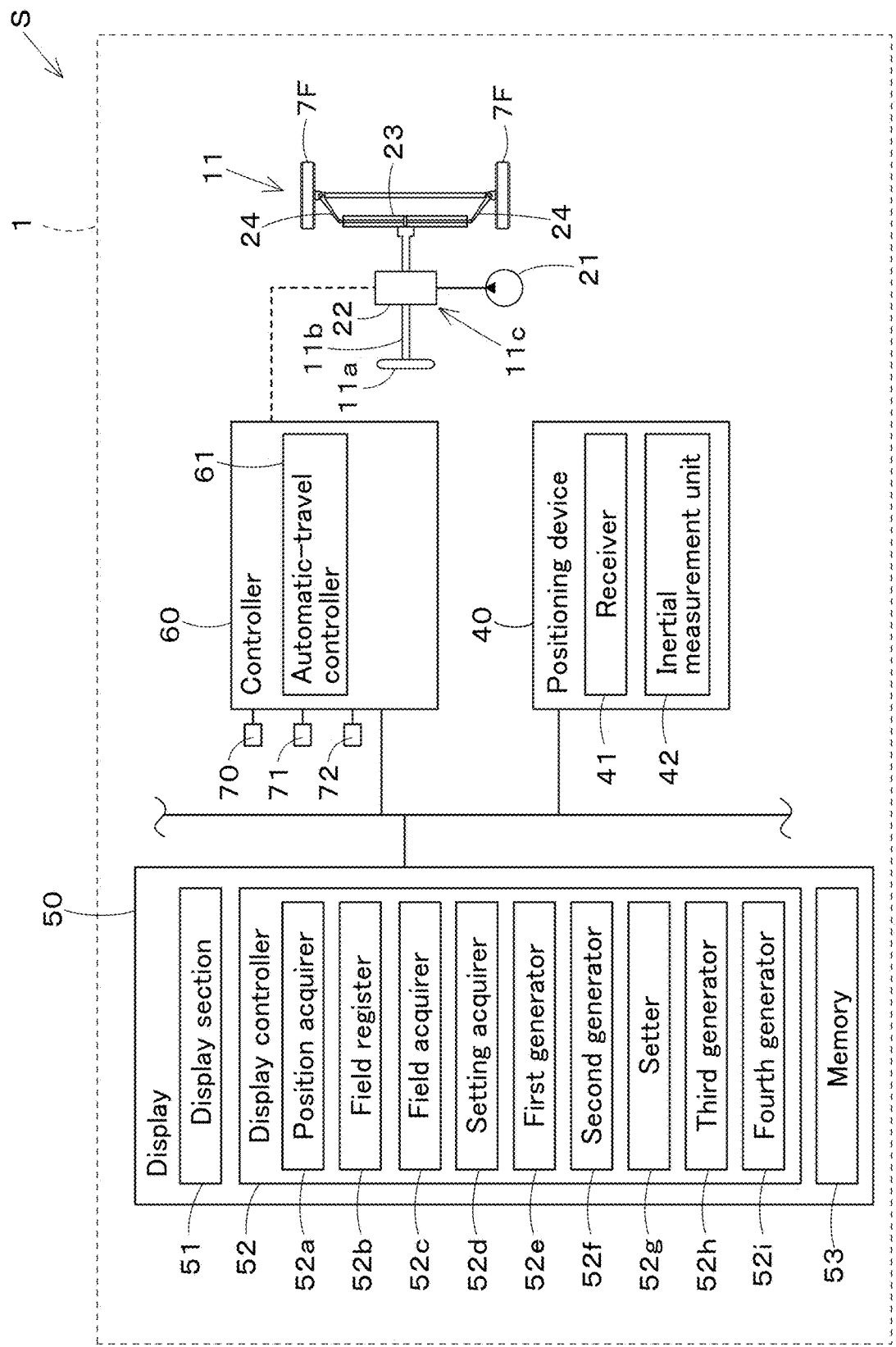
FIG. 1 is a block diagram of an agricultural machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will now be explained while referring to the drawings.

FIG. 1 is a block diagram of a travel line creation system S that creates a travel line L along which an agricultural machine 1 travels when the agricultural machine 1 performs work while making a round in an agricultural field H. The travel line creation system S creates the travel line L along which the agricultural machine 1 is able to perform work in the agricultural field H and then to move to the outside of the agricultural field H or move to another place or the like while avoiding traveling a place where the work has already been performed.

First, the agricultural machine 1 will now be explained. The agricultural machine 1 is a machine to which a working device 2 can be attached, for example, a tractor, a rice transplanter, or the like as illustrated in FIG. 13. In the description below, a tractor is taken as an example of the agricultural machine 1. As illustrated in FIG. 13, the tractor 1 includes a traveling vehicle 3, a prime mover 4, and a transmission 5. The traveling vehicle 3 includes a traveling device 7. The traveling device 7 is a device including front wheels 7F and rear wheels 7R. The front wheels 7F may be of a tire type or a crawler type. The rear wheels 7R may also be of a tire type or a crawler type. The prime mover 4 is a diesel engine, an electric motor, or the like. The transmission 5 is capable of switching a propelling force of the traveling device 7 by shifting gears and is also capable of switching the traveling device 7 between forward traveling and rearward traveling. A cabin 9 is provided on the traveling vehicle 3. An operator's seat 10 is provided inside the cabin 9.

As illustrated in FIG. 13, a lifting device 8 that includes a three-point linkage and the like is provided at a rear portion of the traveling vehicle 3. The working device 2 can be detachably attached to the lifting device 8. Coupling the working device 2 to the lifting device 8 enables the traveling vehicle 3 to tow the working device 2. The working device 2 is, for example, a cultivator for cultivation, a fertilizer spreader for spreading a fertilizer, an agricultural chemical spreader for spreading an agricultural chemical, a harvester for harvesting crops, a mower for cutting grass and the like, a tedder for spreading out grass and the like, a rake for collecting grass and the like, or a baler for baling grass and the like.

As illustrated in FIG. 1, the tractor 1 includes a steering device 11. The steering device 11 includes a steering wheel 11a, a rotation shaft (steering shaft) 11b that rotates with rotation of the steering wheel 11a, and an assist mechanism (power steering mechanism) 11c that assists steering of the steering wheel 11a. The assist mechanism 11c includes a hydraulic pump 21, a control valve 22 to which a hydraulic fluid delivered from the hydraulic pump 21 is supplied, and a steering cylinder 23 that is operated by the control valve 22. The control valve 22 is a solenoid valve that is activated based on a control signal. The control valve 22 is, for example, a three-position switching valve that can be switched by the movement of a spool or the like. The control valve 22 can be switched also by the steering of the steering shaft 11b. The steering cylinder 23 is connected to arms (knuckle arms) 24 configured to change the direction of the front wheels 7F.

Accordingly, when the steering wheel 11a is operated, the switching position and the opening of the control valve 22 are switched in accordance with the steering wheel 11a, and the steering cylinder 23 extends or retracts to the left or right in accordance with the switching position and opening of the control valve 22. As a result, it is possible to change the steering direction of the front wheels 7F. The steering device 11 described above is a mere example, and its configuration is not limited to the configuration described above.

Figure 2:
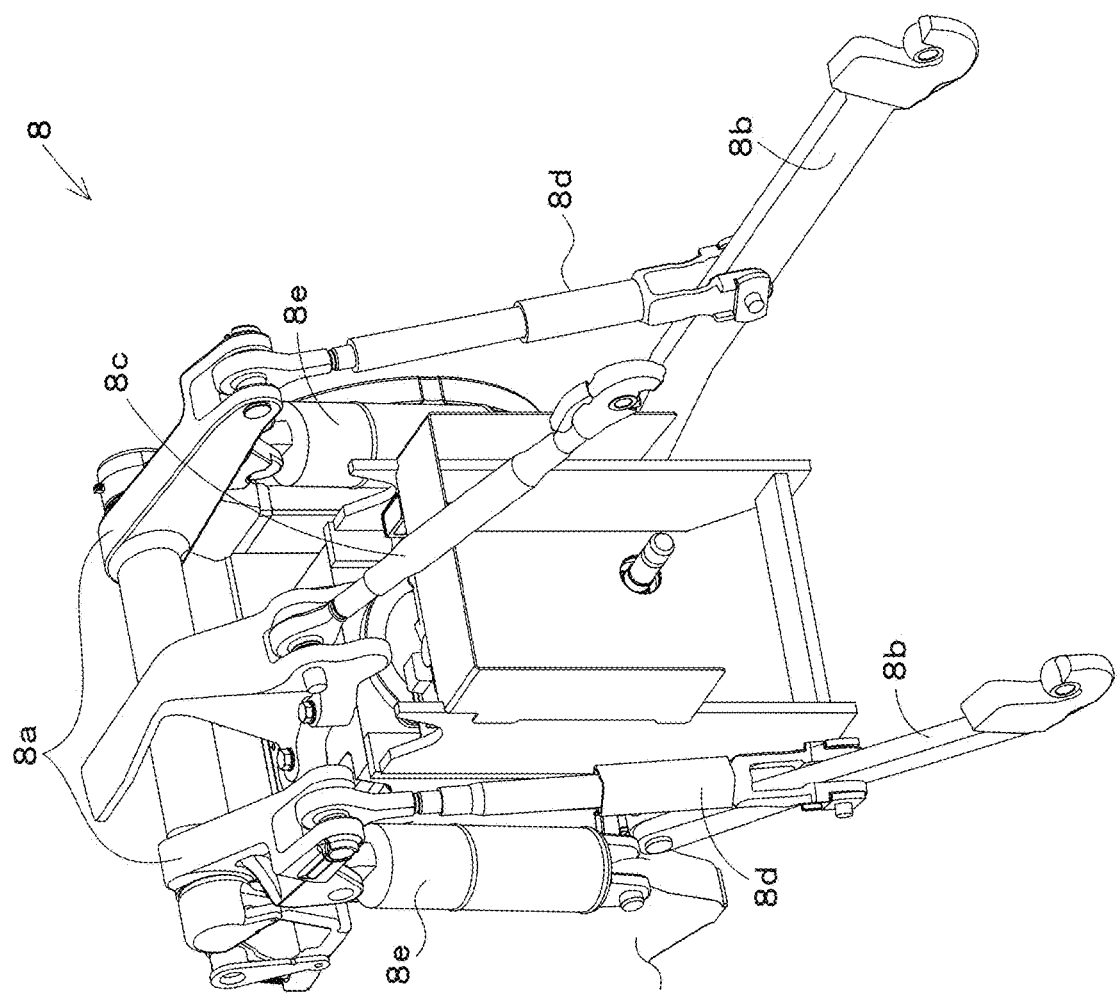
FIG. 2 is a diagram illustrating a lifting device.

As illustrated in FIG. 2, the lifting device 8 includes lift arm(s) 8a, lower link(s) 8b, a top link 8c, lift rod(s) 8d, and lift cylinder(s) 8e. The front end portions of the lift arms 8a are supported in such a way as to be able to move pivotally upward/downward on rear upper portions of a case (transmission case) in which the transmission 5 is housed. The lift arms 8a move pivotally (are raised and lowered) when driven by the lift cylinders 8e. The lift cylinders 8e are hydraulic cylinders. The lift cylinders 8e are connected to a hydraulic pump through a control valve. The control valve is a solenoid valve or the like and causes the lift cylinders 8e to extend and retract.

The front end portions of the lower links 8b are supported in such a way as to be able to move pivotally upward/downward on rear lower portions of the transmission 5. The front end portion of the top link 8c is supported in such a way as to be able to move pivotally upward/downward behind the transmission 5 above the lower links 8b. The lift rods 8d link the lift arms 8a to the lower links 8b. The working device 2 is coupled to the rear portions of the lower links 8b and the rear portion of the top link 8c. When the lift cylinders 8e are driven (to extend or retract), the lift arms 8a are raised or lowered, and the lower links 8b, which are linked to the lift arms 8a via the lift rods 8d, are raised or lowered. As a result, the working device 2 moves upward or downward (is raised or lowered), with the front portions of the lower links 8b acting as fulcrums.

As illustrated in FIG. 1, the tractor 1 includes a positioning device 40. The positioning device 40 is capable of detecting its position (measured position information including latitude and longitude) by using a satellite positioning system (positioning satellites) such as D-GPS, GPS, GLONASS, BeiDou, Galileo, Michibiki, or the like. That is, the positioning device 40 receives satellite signal(s) (positions of the positioning satellites, transmission times, correction information, etc.) transmitted from the positioning satellites, and detects the position (for example, latitude and longitude) of the tractor 1, namely, a vehicle-body position VP, based on the satellite signals. The positioning device 40 includes a receiver 41 and an inertial measurement unit (IMU) 42. The receiver 41 is a device including an antenna and the like and configured to receive satellite signals transmitted from the positioning satellites. The receiver 41 is mounted on the traveling vehicle 3 separately from the inertial measurement unit 42. In the present preferred embodiment, the receiver 41 is mounted on the traveling vehicle 3, specifically, on the cabin 9. The position where the receiver 41 is mounted is not limited to the position described in the present preferred embodiment.

The inertial measurement unit 42 includes an acceleration sensor that detects an acceleration, a gyroscope sensor that detects an angular speed, and the like. The inertial measurement unit 42 is disposed in the traveling vehicle 3, for example, below the operator's seat 10, and is capable of detecting a roll angle, a pitch angle, a yaw angle, and the like of the traveling vehicle 3.

As illustrated in FIG. 1, the tractor 1 includes a controller 60. The controller 60 is a device that controls a traveling system, a working system, and the like in the tractor 1.

The controller 60 includes an automatic-travel controller 61 that controls automatic traveling of the tractor 1. The automatic-travel controller 61 includes electric/electronic circuit(s) provided in the controller 60, program(s) stored in a CPU, etc., and/or the like. Upon start of automatic traveling, the automatic-travel controller 61 controls the control valve 22 of the steering device 11 such that the traveling vehicle 3 travels along a planned travel route L that has been set in advance. Moreover, upon start of automatic traveling, the automatic-travel controller 61 controls the velocity (vehicle speed) of the tractor 1 by automatically changing the gear-shift position of the transmission 5, the number of revolutions of the prime mover 4, and the like.

Figure 3:
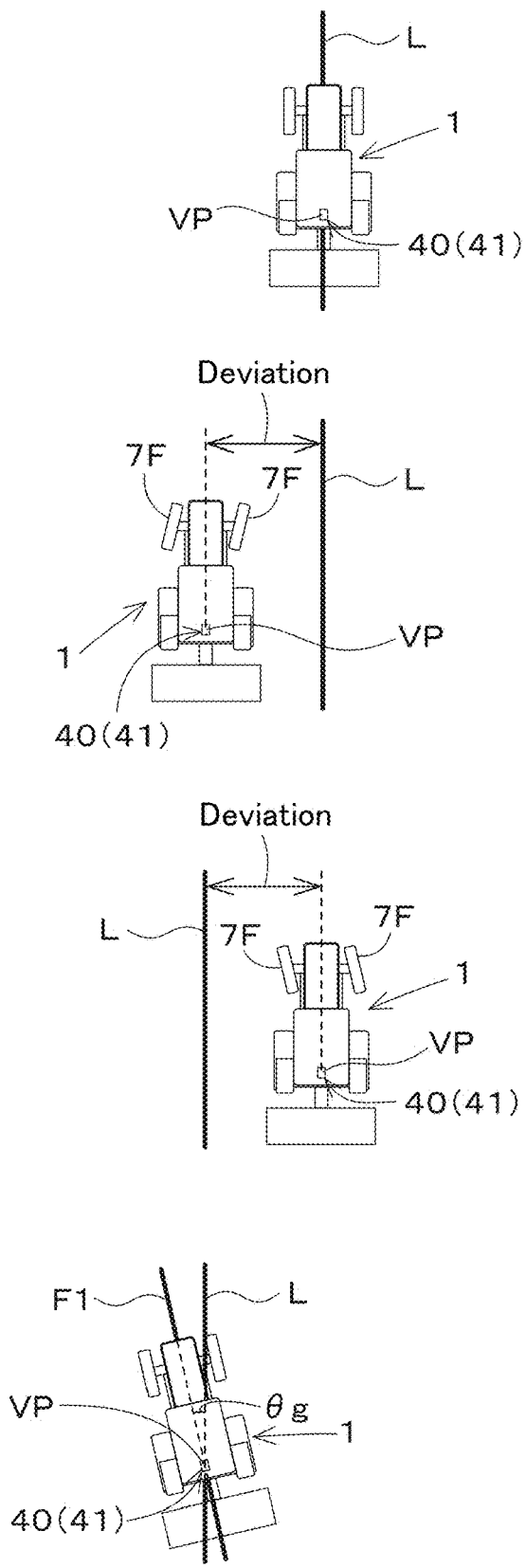
FIG. 3 is a diagram for explaining automatic traveling of the agricultural machine.

As illustrated in FIG. 3, in a situation where the tractor 1 is traveling automatically, if a deviation of the vehicle-body position VP from the planned travel route L is less than a threshold value, the automatic-travel controller 61 keeps the rotation angle of the steering shaft (rotation shaft) 11b. If the deviation of the vehicle-body position VP from the planned travel route L is not less than the threshold value and, in addition, the tractor 1 is located to the left of the planned travel route L, the automatic-travel controller 61 causes the steering shaft 11b to rotate so as to steer the tractor 1 to the right. If the deviation of the vehicle-body position VP from the planned travel route L is not less than the threshold value and, in addition, the tractor 1 is located to the right of the planned travel route L, the automatic-travel controller 61 causes the steering shaft 11b to rotate so as to steer the tractor 1 to the left.

In the preferred embodiment described above, the steering angle of the steering device 11 is changed based on the deviation of the vehicle-body position VP from the planned travel route L. However, in a case where the azimuth (vehicle-body azimuth) F1 of the direction in which the tractor 1 (the traveling vehicle 3) is headed (the traveling direction) is different from the azimuth of the planned travel route L, that is, if the angle θg of the vehicle-body azimuth F1 relative to the planned travel route L is not less than a threshold value, the automatic-travel controller 61 may set the steering angle such that the angle θg will become zero (the vehicle-body azimuth F1 will match the azimuth of the planned travel route L). The automatic-travel controller 61 may, based on a steering angle calculated based on the position (position deviation) and a steering angle calculated based on the azimuth (azimuth deviation), set a final steering angle in automatic steering. The setting of the steering angle in automatic steering according to the preferred embodiment described above is a mere example and is not limited thereto.

The tractor 1 (the traveling vehicle 3) is capable of traveling automatically while being controlled by the controller 60 as described above.

The controller 60 is capable of performing manual raising and lowering control, automatic raising control, and the like. In the manual raising and lowering control, based on an operation of a raising/lowering switch 72 connected to the controller 60, the lifting device 8 is controlled to raise or lower the working device 2. Specifically, the raising/lowering switch 72 is a three-position selector switch provided near the operator's seat 10. When the raising/lowering switch 72 is switched from a neutral position to one side, a raising signal for moving the lifting device 8 (the lift arms 8a) up is inputted into the controller 60. When the raising/lowering switch 72 is switched from the neutral position to the other side, a lowering signal for moving the lifting device 8 (the lift arms 8a) down is inputted into the controller 60. Upon acquiring the raising signal, the controller 60 outputs a control signal to the control valve to move the lifting device 8 up. Upon acquiring the lowering signal, the controller 60 outputs a control signal to the control valve to move the lifting device 8 down. That is, the controller 60 is capable of performing manual raising and lowering control for moving the lifting device 8 up/down in accordance with a manual operation of the raising/lowering switch 72.

In the automatic raising control, if the steering angle of the steering device 11 is not less than a predetermined value, for example, if the steering angle of the steering device 11 is a steering angle corresponding to making a turn, the lifting device 8 is automatically activated to raise the working device 2. Specifically, a steering angle detector 70 and a selector switch 71 are connected to the controller 60. The steering angle detector 70 is a device that detects the steering angle of the steering device 11. The selector switch 71 is a switch to switch the automatic raising control between "enabled" and "disabled". The selector switch 71 is switchable between ON and OFF. The automatic raising control is set to be enabled when the selector switch 71 is ON. The automatic raising control is set to be disabled when the selector switch 71 is OFF.

If the automatic raising control is enabled and, in addition, the steering angle detected by the steering angle detector 70 is not less than the steering angle corresponding to making a turn, the controller 60 outputs a control signal to the control valve, thus performing the automatic raising control for moving the lifting device 8 up automatically.

As described above, the controller 60 is capable of performing control related to the tractor 1, for example, the manual raising and lowering control and the automatic raising control.

As illustrated in FIG. 1, the travel line creation system S for the agricultural machine 1 includes a display 50, a position acquirer 52a, a field register 52b, and a field acquirer 52c.

The display 50 is a traveling assisting device provided near the operator's seat 10. The display 50 includes a display section 51, a display controller 52, and a memory 53. The display section 51 is a liquid crystal panel, a touch panel, or other kind of panel. The display section 51 is capable of displaying a field F that represents an agricultural field H. Besides information for providing assistance for traveling of the tractor 1, the display section 51 is capable of displaying various kinds of information regarding the tractor 1 and the working device 2. The display controller 52 includes electric/electronic component(s) provided in the display 50, program(s) stored in the memory 53 mentioned below, and/or the like. The display controller 52 causes the display section 51 to display a screen that is visualization of information stored in the memory 53. The memory 53 is a non-volatile memory or the like. The memory 53 stores various kinds of information regarding the tractor 1 and the working device 2. The display 50 is connected to devices of the agricultural machine 1 such that wired communication or wireless communication can be performed therebetween. The display 50 is capable of transmitting information to the devices and receiving information from the devices. Specifically, for example, the display controller 52 of the display 50 is connected to the controller 60 of the working machine such that communication can be performed therebetween.

As illustrated in FIG. 1, the position acquirer 52a, the field register 52b, and the field acquirer 52c each include electric/electronic component(s), program(s) installed in the display 50, and/or the like. In the present preferred embodiment, the display controller 52 of the display 50 functions also as the position acquirer 52a, the field register 52b, and the field acquirer 52c. Though the display controller 52 of the display 50 functions also as the position acquirer 52a, the field register 52b, and the field acquirer 52c in the present preferred embodiment, an external server, etc. capable of communicating with the display 50 may include the position acquirer 52a, the field register 52b, and the field acquirer 52c, and the configuration thereof is not limited to the configuration described above.

The position acquirer 52a acquires a plurality of position measurement points Pk (k: each position measurement point, k=1, 2, 3, . . . , k) obtained when the tractor 1 makes a round in the agricultural field H. Specifically, based on positions of the tractor 1 detected by the positioning device 40 (vehicle-body positions VP), the position acquirer 52a acquires a plurality of position measurement points Pk obtained when the tractor 1 makes a round in the agricultural field H. In the present preferred embodiment, the position acquirer 52a is capable of acquiring vehicle-body positions VP including a plurality of position measurement points Pk obtained when the tractor 1 makes a round in the agricultural field H. It is sufficient as long as the position acquirer 52a is capable of acquiring a plurality of position measurement points Pk. The position acquirer 52a may be configured to acquire position information of the plurality of position measurement points Pk from a storage device such as a memory in which the position information of the plurality of position measurement points Pk is stored. The method for acquisition is not limited to the method described above.

In the present preferred embodiment, based on the vehicle-body positions VP detected by the positioning device 40, the position acquirer 52a is capable of acquiring the position of an entrance-and-exit (hereinafter "entrance/exit") I of the agricultural field H as a position measurement point Pk. For example, when the operator operates the display 50 while the tractor 1 makes a round in the agricultural field H, the position acquirer 52a associates a vehicle-body position VP obtained at this location with the position measurement point Pk of the entrance/exit I of the agricultural field H, and acquires the position measurement point Pk of the entrance/exit I of the agricultural field H. It is sufficient as long as the position acquirer 52a is capable of acquiring the position of the entrance/exit I of the agricultural field H. The position acquirer 52a may be configured to acquire position information of the entrance/exit I from a storage device such as a memory in which the position information of the entrance/exit I is stored. The operator may operate the display 50 and may designate any position as the entrance/exit I on the field F displayed on the display section 51. The method for acquisition is not limited to the method described above.

Figure 4:
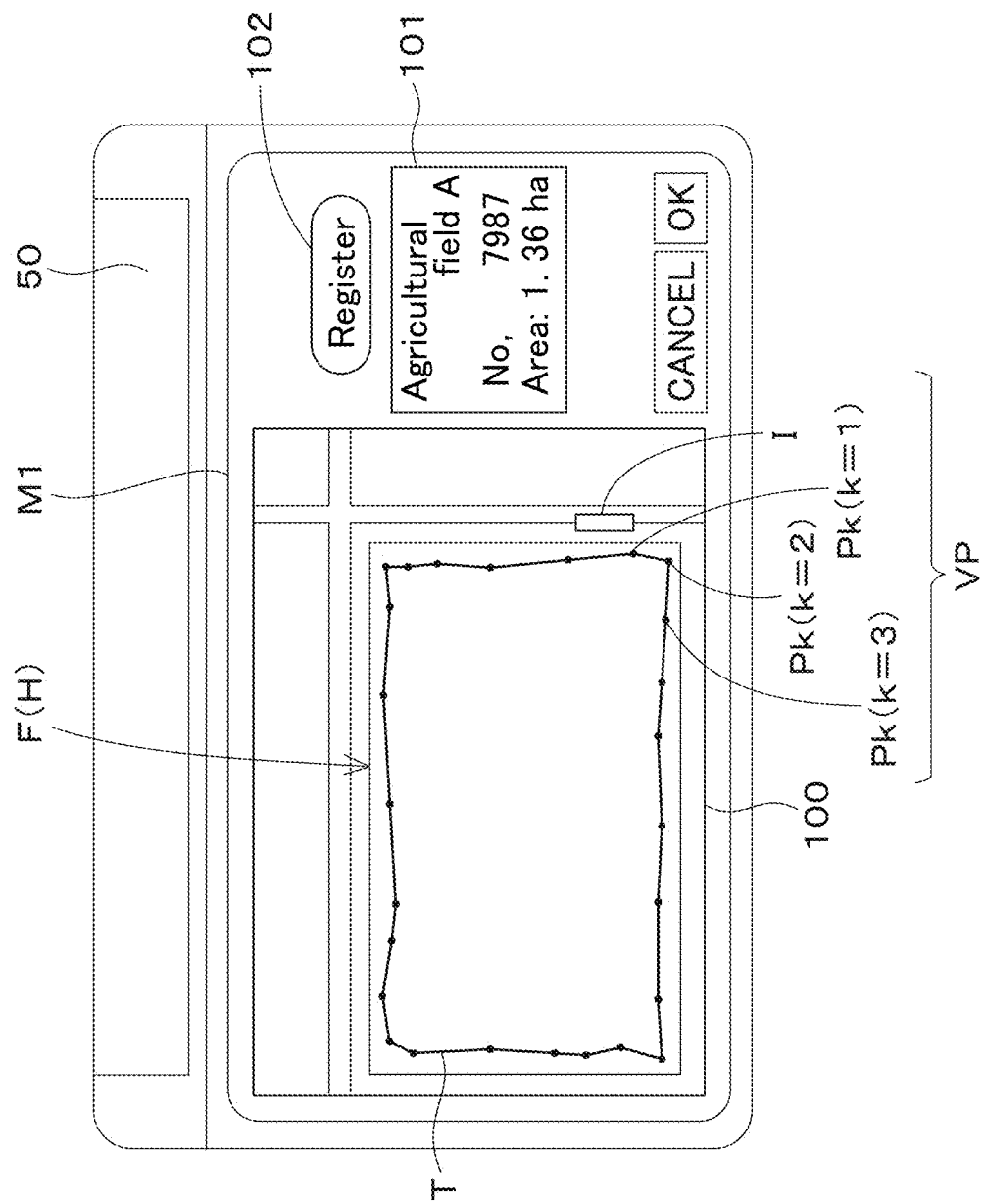
FIG. 4 is a diagram illustrating an example of a field registration screen M1.

The field register 52b registers a contour E of a particular agricultural field H, for example, positions corresponding to the contour E of the particular agricultural field H, as the field F displayed on the display section 51. As illustrated in FIG. 4, when the operator performs a predetermined operation on the display 50, the display controller 52 displays a field registration screen M1 on the display section 51. A field display section 100, which shows the field F including the agricultural field H and vehicle-body position(s) VP of the tractor 1, and an information display section 101, which shows agricultural field identification information such as an agricultural field name and an agricultural field management number, are displayed on the field registration screen M1. Position information such as latitude and longitude, besides image data representing the agricultural field H, is associated with the field F. When the tractor 1 enters the agricultural field H and makes a round in the agricultural field H, based on the position information acquired by the position acquirer 52a from the positioning device 40, the display controller 52 displays the current vehicle-body positions VP of the tractor 1 making a round on the field registration screen M1.

Figure 5A:
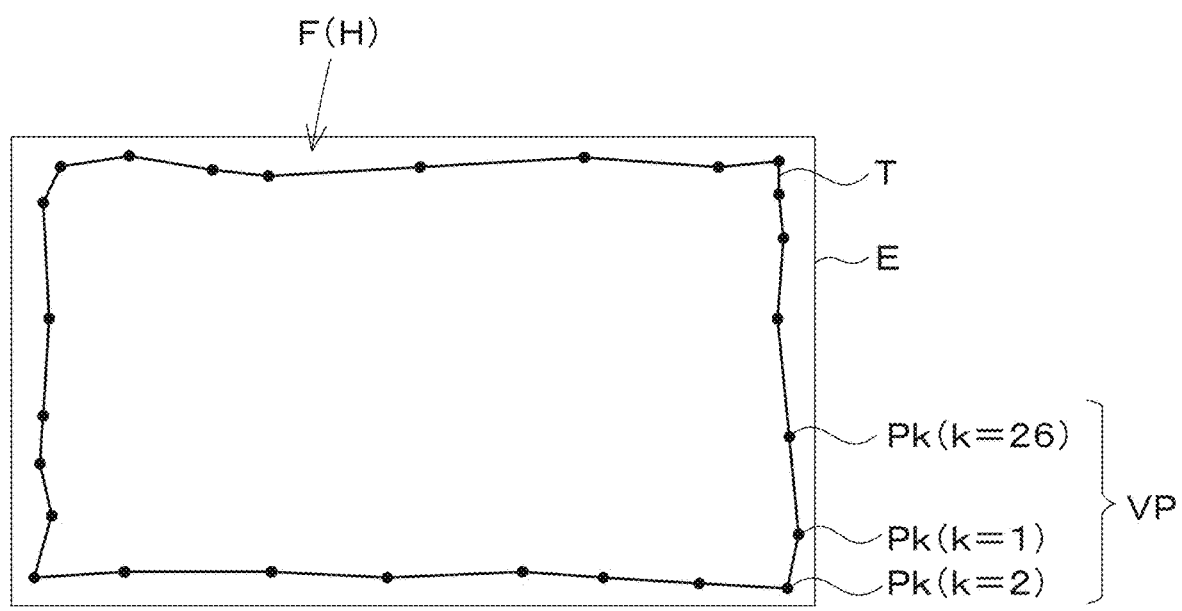
FIG. 5A is a diagram illustrating determination of a contour of an agricultural field from position measurement points.

When the tractor 1 finishes making a round in the agricultural field H and the operator selects a Register button 102 displayed on the field registration screen M1, as illustrated in FIG. 5A, based on a travel trajectory T obtained from the position information of a plurality of position measurement points Pk acquired by the position acquirer 52a (the vehicle-body positions VP), the field register 52b creates the contour (outline) E of the agricultural field H and registers, together with the agricultural field identification information, the field F represented by the contour E. Specifically, the memory 53 stores the field F indicating the contour (outline) E registered by the field register 52b. That is, the memory 53 stores the field F, which is data indicating the contour E of the agricultural field H (data for representation of the predetermined agricultural field H).

Figure 5B:
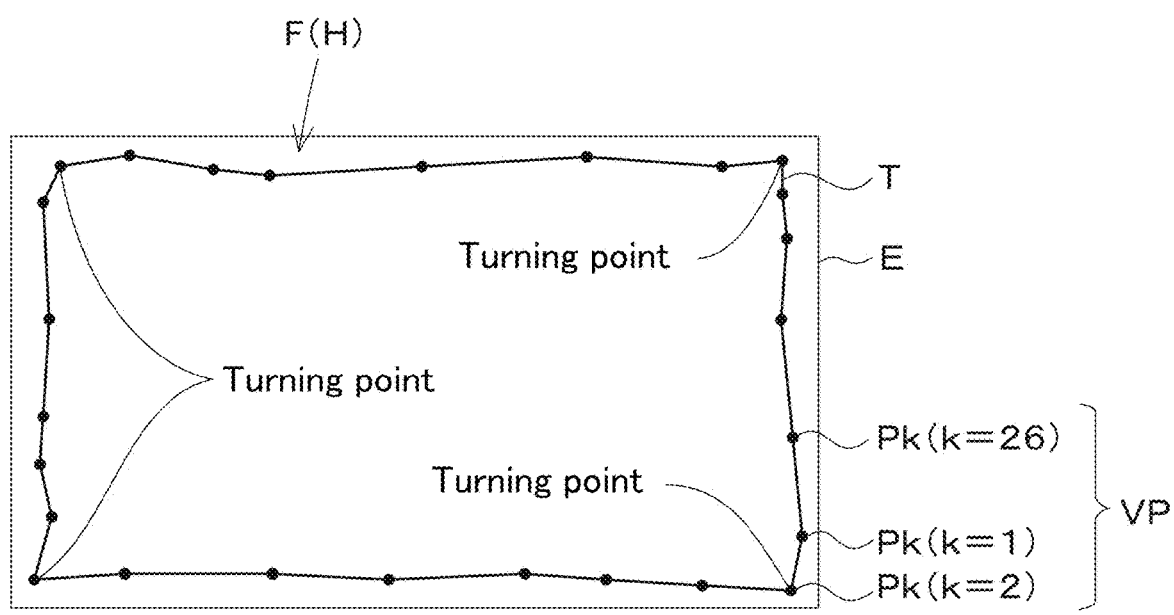
FIG. 5B is a diagram illustrating the determination of the contour of the agricultural field from turning points.
Figure 5C:
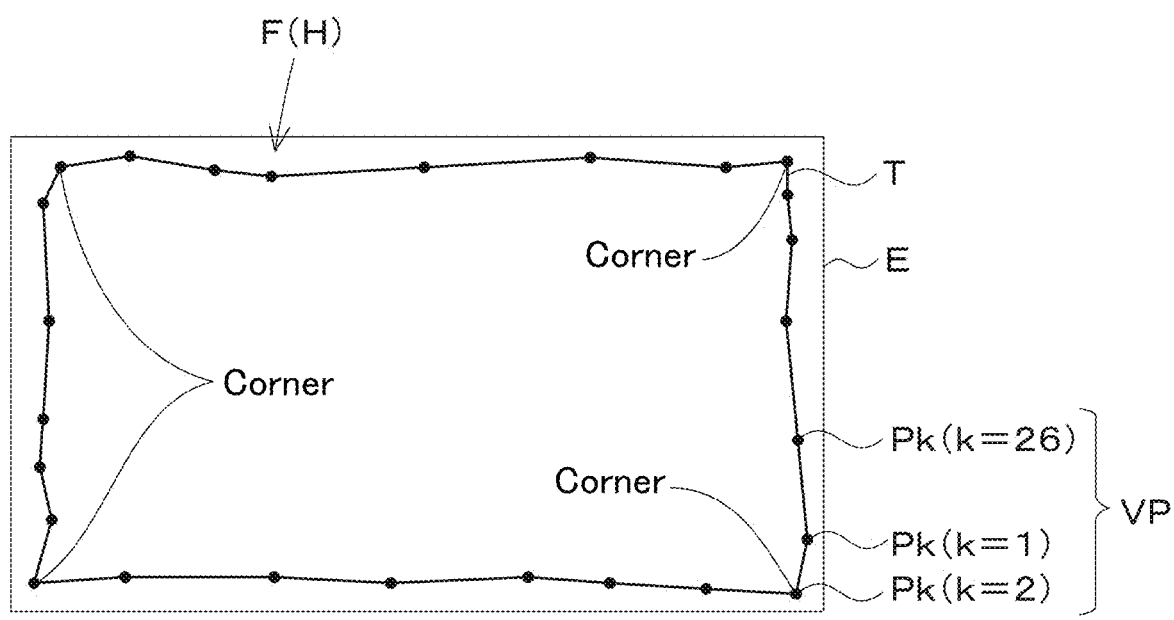
FIG. 5C is a diagram illustrating the determination of the contour of the agricultural field from end portions of the agricultural field.

As illustrated in FIG. 5B, the field register 52b may calculate turning points from the travel trajectory T represented by the vehicle-body positions VP and register the contour E connecting the turning points as the field F for the agricultural field H. As illustrated in FIG. 5C, the operator, etc. may designate end portions of the agricultural field H by operating a switch, etc. provided on the tractor 1 when the tractor 1 is making a round, and the field register 52b may register, as the field F, the contour E that is based on the designated end portions. The field register 52b may be configured to acquire information of the field F from a storage device such as a memory in which the information of the field F including the agricultural field H is stored, and then register the agricultural field H. The methods for registration of the agricultural field H described above are mere examples and are not limited thereto. The contour E of the agricultural field H, that is, the field F, may be data represented by positions (latitude and longitude), may be data represented using a coordinate system (X axis, Y axis), and may be data represented in some other manner.

As described above, the display 50 is capable of causing the field register 52b to register a plurality of fields F. The field acquirer 52c acquires a field F representing a particular agricultural field H among the plurality of fields F when work, etc. is to be performed.

When the operator performs a predetermined operation on the display 50, the field acquirer 52c displays a predetermined field selection screen (not illustrated) on the display section 51 of the display 50. Maps of the agricultural fields H stored in the memory 53 are, or a list of the agricultural fields H is, displayed on the field selection screen. The operator is able to, for example, select one agricultural field H from among the plurality of agricultural fields H displayed on the field selection screen by performing a predetermined operation on the display 50. When the one agricultural field H is selected, the field acquirer 52*c* looks up the memory 53 and acquires the field F that corresponds to the selected agricultural field H.

The travel line creation system S for the agricultural machine 1 is capable of creating travel line(s) L along which the agricultural machine 1 makes a round in the agricultural field H. In the present preferred embodiment, the agricultural machine 1 performs automatic traveling along this travel line L as a planned travel route. In the present preferred embodiment, it is sufficient as long as the travel line L functions as a route along which the agricultural machine 1 makes a round in the agricultural field H. The agricultural machine 1 may be manually operated to travel along the travel line L.

Figure 6A:
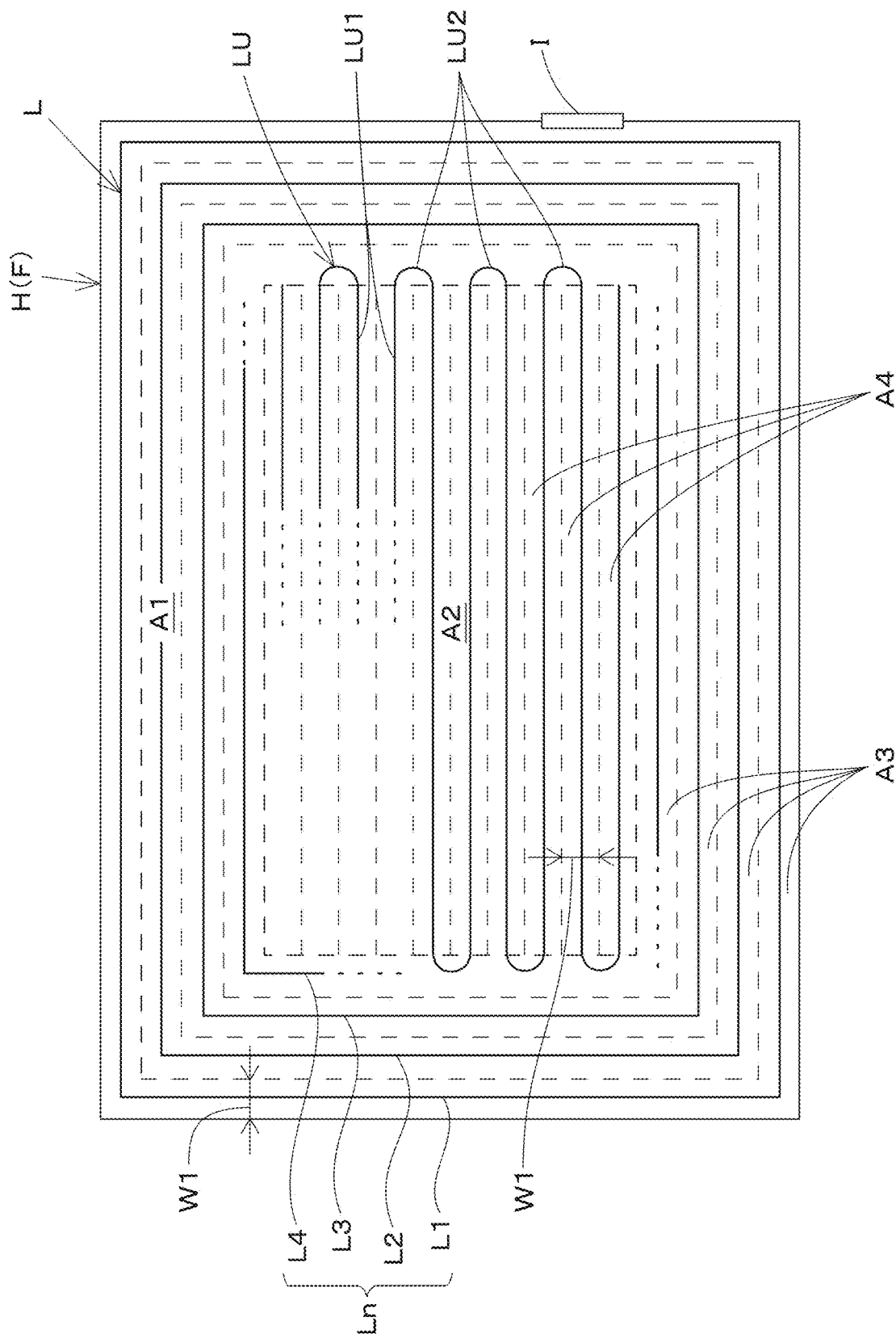
FIG. 6A is a diagram illustrating how a travel line and a unit work zone are generated.

Specifically, as illustrated in FIG. 6A, the travel line creation system S for the agricultural machine 1 sets, as travel lines L along each of which the agricultural machine 1 makes a round, headland work lines Ln (n: headland number (loop number), n=1, 2, 3, . . . , n) to perform work on the headland (headland area A1) of the agricultural field H. It is sufficient as long as the travel line creation system S for the agricultural machine 1 creates at least travel line(s) L along which the agricultural machine 1 makes a round in the agricultural field H. In the present preferred embodiment, in addition to loop lines (headland work lines) Ln which are travel lines L including a loop in the agricultural field H, the travel line creation system S for the agricultural machine 1 is capable of creating inner line(s) LU which is/are travel line(s) L located inward of the headland area A1 (located in an inner area A2).

Figure 6B:
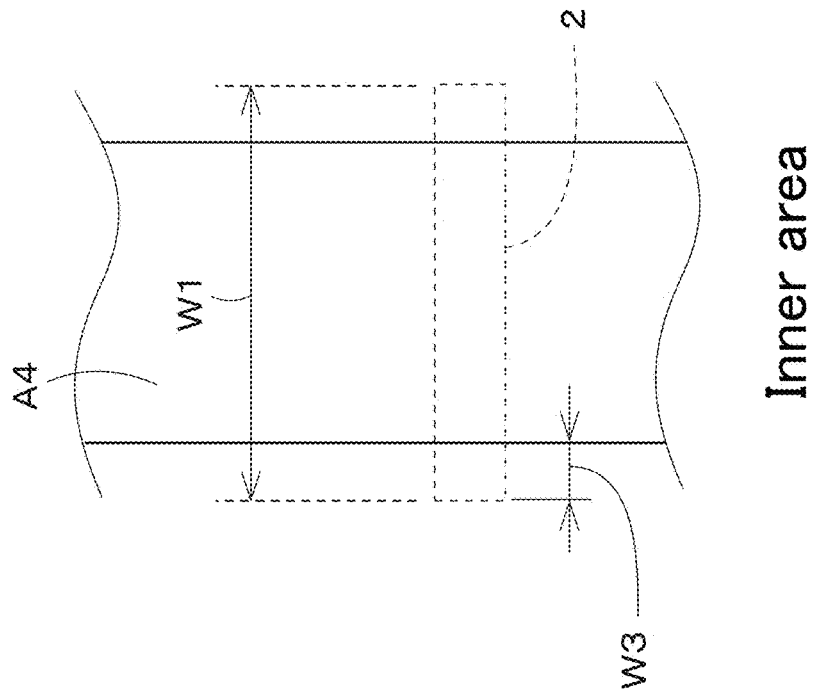
FIG. 6B is a diagram illustrating a travel line and a unit work zone that are different from those of FIG. 6A.
Figure 6B:
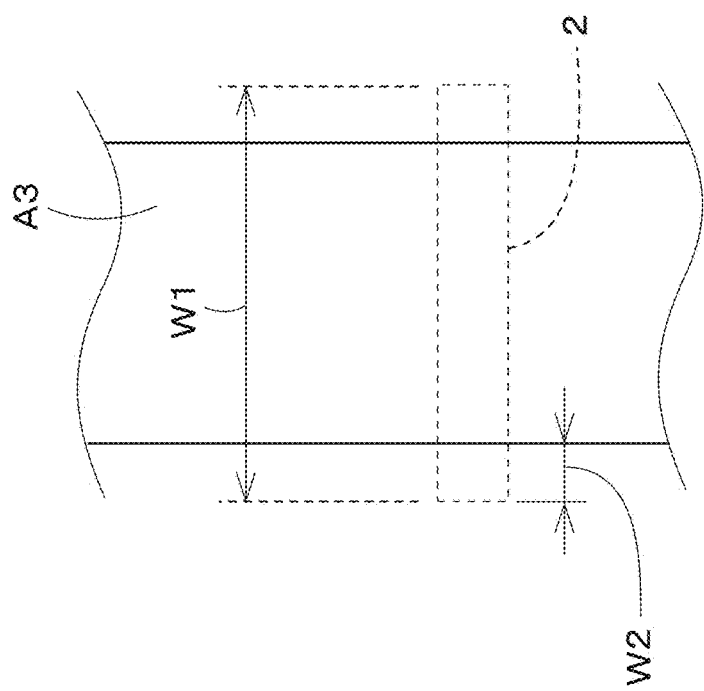

As illustrated in FIG. 6A, the travel line creation system S for the agricultural machine 1 creates, in the agricultural field H, a plurality of unit work zones A3 and A4 corresponding to the travel lines L (the loop line(s) Ln and the inner line(s) LU) and having the same width as a work width W1. As illustrated in FIG. 6B, the travel line creation system S for the agricultural machine 1 may create, in the inner area A2, a plurality of unit work zones A3 and A4 having a width calculated by subtracting overlap width(s) W2, W3 from the work width W1. In this case, the travel line creation system S for the agricultural machine 1 creates a plurality of first work zones A3 having a width calculated by subtracting the first overlap width(s) W2 from the work width W1, in the headland area A1, as the unit work zones A3, A4 corresponding to the loop lines Ln. In addition, the travel line creation system S for the agricultural machine 1 creates a plurality of second work zones A4 having a width calculated by subtracting the second overlap width(s) W3 from the work width W1, in the inner area A2, as the unit work zones A3, A4 corresponding to the inner line LU.

As illustrated in FIG. 6A, the loop lines Ln are travel lines L along each of which the agricultural machine 1 makes a round in the headland area A1, and the number of paths corresponds to the number of headlands in the agricultural field H. That is, if the number of headlands is four, as illustrated in FIG. 6A, the paths of the loop lines Ln are four paths located adjacent to each other in a direction from the central portion of the field F outward. If the number of headlands is five, the paths of the loop lines Ln are five paths adjacent to each other in the direction from the central portion of the field F outward.

In the description below, terms "first loop line L1", "second loop line L2", "third loop line L3", . . . , and "n-th loop line Ln" (n=1, 2, 3, . . . , n) counted in order from the outermost loop line Ln toward the innermost loop line Ln will be used for the loop lines Ln. In FIG. 6A, portions of the fourth loop line L4 that overlap the inner line LU is not illustrated.

As illustrated in FIG. 6A, the inner line LU includes straight portion(s) LU1 each connecting two ends in the longitudinal direction of the inner area A2, and turning portion(s) LU2 each connecting adjacent straight portions LU1. That is, the agricultural machine 1 traveling along the inner line LU makes a turn at each turning portion LU2 to move from one straight portion LU1 to its adjacent straight portion LU1, thus traveling back and forth between one end and the other end of the inner area A2.

As illustrated in FIG. 1, the travel line creation system S for the agricultural machine 1 includes a setting acquirer 52*d*, a first generator 52*e*, a second generator 52*f*, a setter 52*g*, a third generator 52*h*, and a fourth generator 52*i*. The setting acquirer 52*d*, the first generator 52*e*, the second generator 52*f*, the setter 52*g*, the third generator 52*h*, and the fourth generator 52*i* each include electric/electronic component(s), program(s) installed in the display 50, and/or the like. In the present preferred embodiment, the display controller 52 of the display 50 functions also as the setting acquirer 52*d*, the first generator 52*e*, the second generator 52*f*, the setter 52*g*, the third generator 52*h*, and the fourth generator 52*i*.

Though the display controller 52 of the display 50 functions also as the setting acquirer 52*d*, the first generator 52*e*, the second generator 52*f*, the setter 52*g*, the third generator 52*h*, and the fourth generator 52*i* in the present preferred embodiment, an external server, etc. capable of communicating with the display 50 may include the setting acquirer 52*d*, the first generator 52*e*, the second generator 52*f*, the setter 52*g*, the third generator 52*h*, and the fourth generator 52*i*, and the configuration thereof is not limited to the configuration described above.

Figure 7:
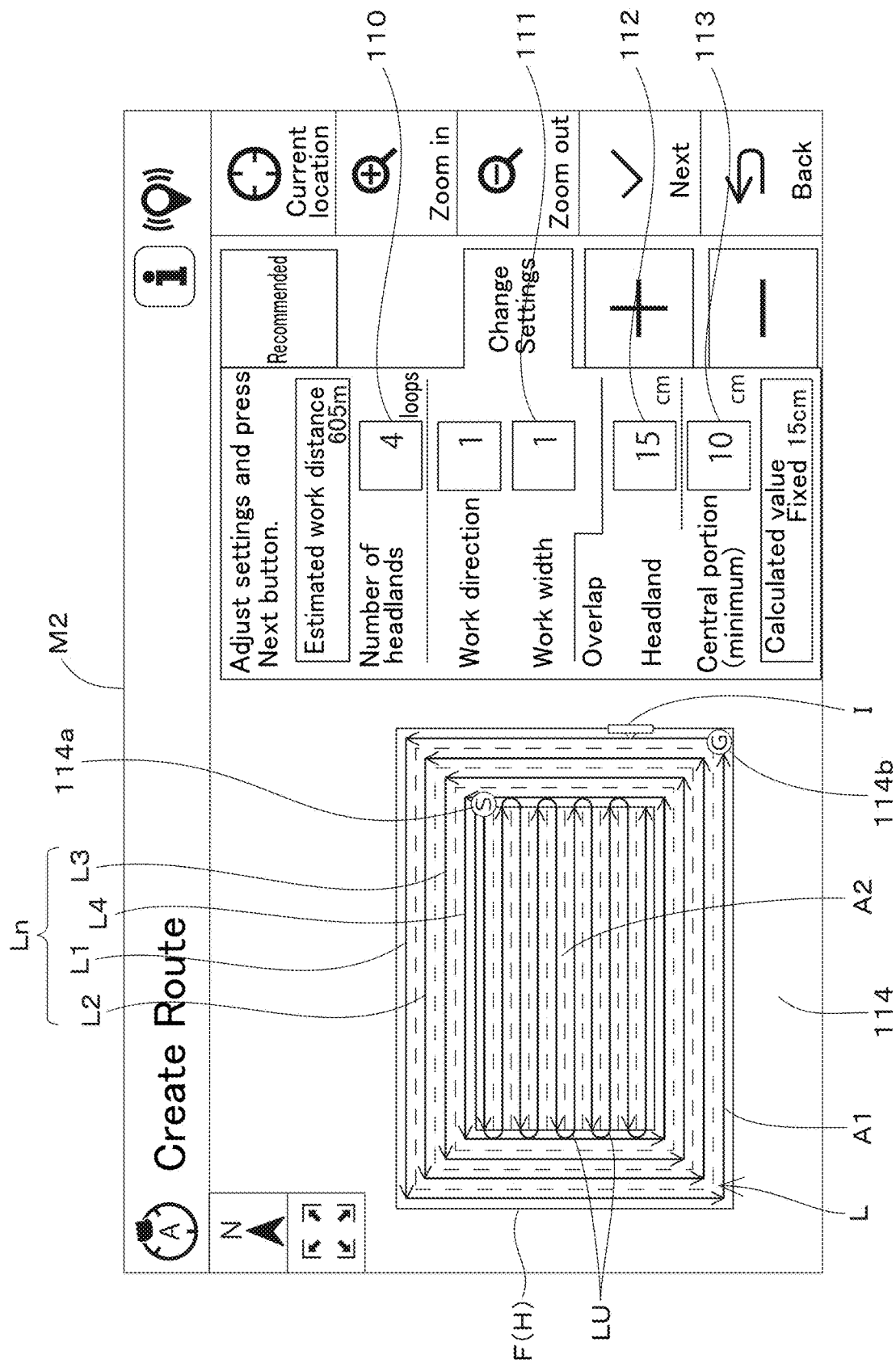
FIG. 7 is a diagram illustrating an example of a setting screen M2.

The setting acquirer 52*d* acquires setting information regarding the creation of the travel line(s) L. When the operator performs a predetermined operation on the display 50, as illustrated in FIG. 7, the display controller 52 displays a setting screen M2. The setting screen M2 includes a number-of-headlands input box 110, a first width input box 111, a second width input box 112, a third width input box 113, and a route display section 114. The number-of-headlands input box 110 receives an input of the number of headlands. In the example illustrated in FIGS. 6A and 7, the number of headlands is four, and four paths are formed as loop lines Ln.

The first width input box 111 receives an input of the work width W1 of the working device 2. The work width W1 is a width over which the working device 2 performs work on the ground of the agricultural field H or the like (width over which work is done).

The second width input box 112 receives an input of the overlap width (first overlap width) W2, which is the width of overlap with an adjacent first work zone A3 on the loop lines Ln. The third width input box 113 receives an input of the overlap width (second overlap width) W3, which is the width of overlap with an adjacent second work zone A4 on the inner line LU.

The field F acquired by the field acquirer 52c is displayed in the route display section 114. In addition, the route display section 114 is capable of displaying the created travel line(s) L on the field F.

In the present preferred embodiment, the setting acquirer 52d acquires information inputted on the setting screen M2 to acquire setting information regarding the creation of the travel line(s) L. However, the setting acquirer 52d may acquire information that is stored in the memory 53. The source for acquisition is not limited to the configuration described above.

Figure 8:
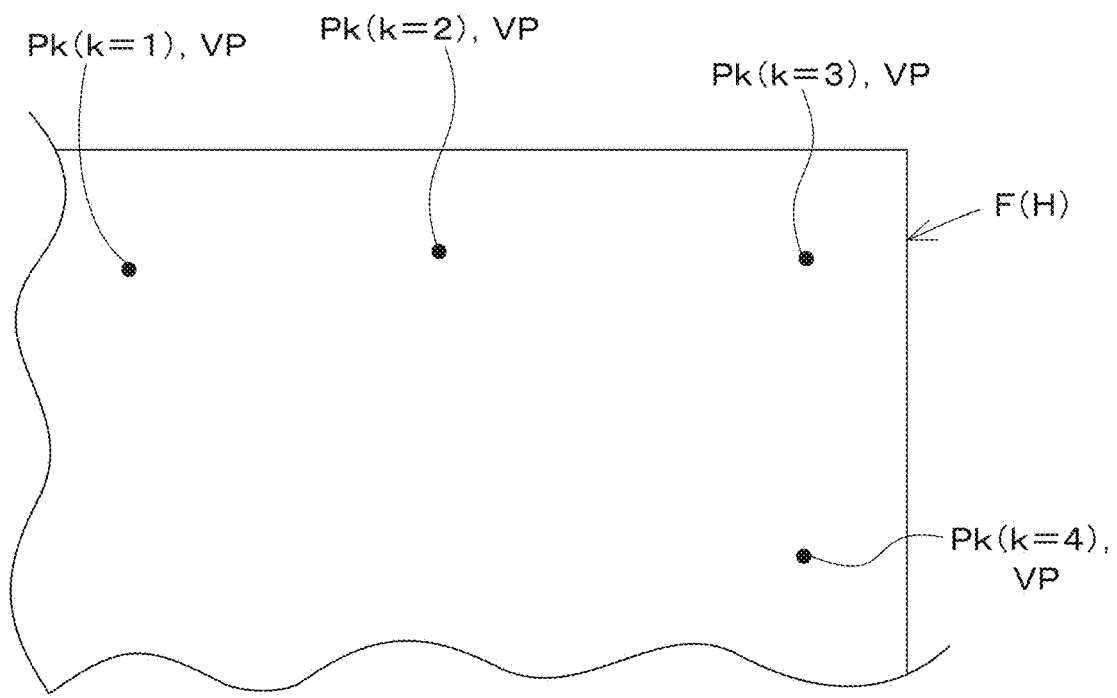
FIG. 8 is a diagram for explaining creation of creation points.
Figure 8:
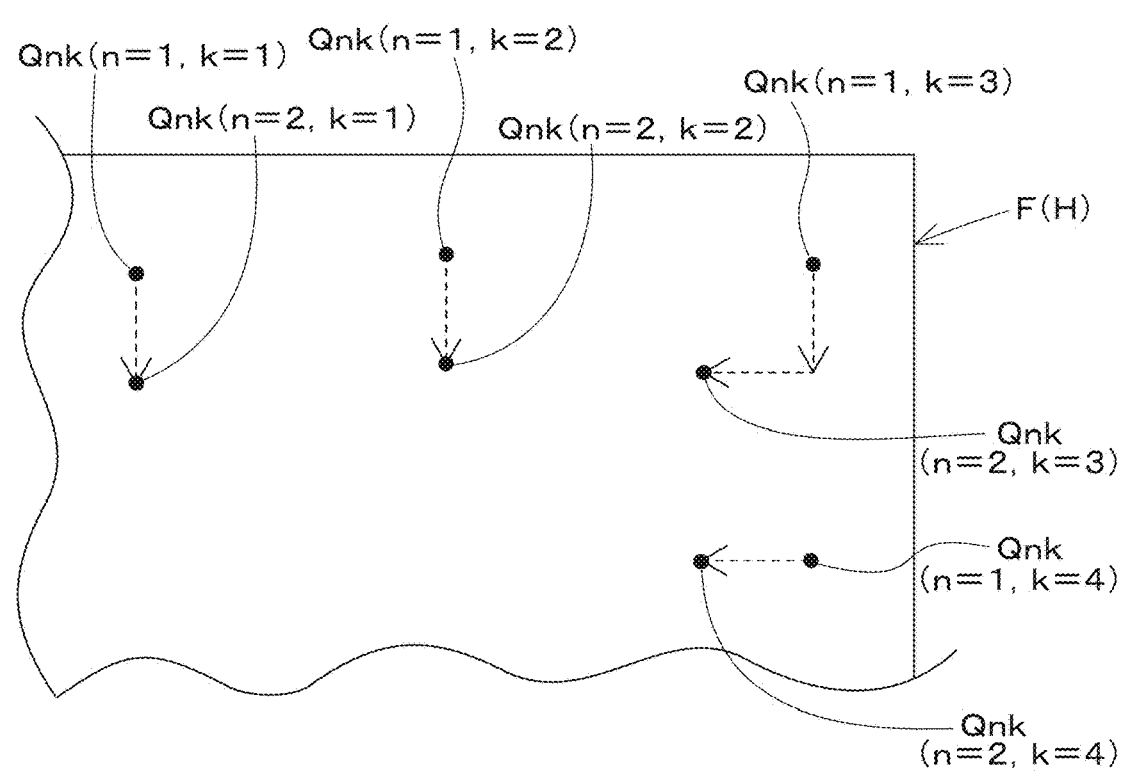

The first generator 52e associates a plurality of position measurement points Pk with the field F displayed by the display 50. In addition, as illustrated in FIG. 8, the first generator 52e generates a plurality of creation points Qnk (n: headland number (loop number), n=1, 2, 3, . . . , n) (k: indicating a creation point, k=1, 2, 3, . . . , k) in the field F by shifting the plurality of position measurement points Pk inward in the agricultural field H. Based on the plurality of position measurement points Pk acquired by the position acquirer 52a, the first generator 52e generates a plurality of creation points Qnk. In the present preferred embodiment, the plurality of creation points Qnk include a plurality of position measurement points Pk and a plurality of creation points Qnk obtained by shifting the plurality of position measurement points Pk.

The creation points Qnk are points through which a path of a loop line Ln passes. For example, in a case where the first work zones A3 are created based on the work width W1 as illustrated in FIG. 6A, the first generator 52e generates a plurality of creation points Qnk in accordance with the number of headlands acquired by the setting acquirer 52d and a shift width that is based on the work width W1 (the shift width=the work width W1). As illustrated in FIG. 6B, in a case where the first work zones A3 having a width calculated by subtracting the overlap width(s) W2 from the work width W1 are created, the first generator 52e generates a plurality of creation points Qnk in accordance with the number of headlands acquired by the setting acquirer 52d and a shift width that is based on a difference between the work width W1 and the first overlap width(s) W2 (the shift width=the work width W1−the first overlap width(s) W2).

Specifically, as illustrated in FIG. 8, based on the number of headlands and the shift width, the first generator 52e generates creation points Qnk for each of the headlands adjacent to each other (n=1, 2, 3, . . . , n). In the description below, terms "first creation points Q1k", "second creation points Q2k", "third creation points Q3k", . . . , and "n-th creation points Qnk" counted in order from the outermost creation points Qnk toward the innermost loop line Ln will be used. The first creation points Q1k correspond to (are the same as) the plurality of position measurement points Pk. For example, if the number of headlands is four, the first generator 52e first generates the second creation points Q2k by shifting the plurality of position measurement points Pk (the first creation points Q1k) inward by the shift width. The first generator 52e generates the third creation points Q3k by shifting the plurality of position measurement points Pk inward by a width that is twice as great as the shift width, that is, by shifting the second creation points Q2k inward by the shift width. The first generator 52e generates the fourth creation points Q4k by shifting the plurality of position measurement points Pk inward by a width that is three times as great as the shift width, that is, by shifting the third creation points Q3k inward by the shift width.

Figure 9A:
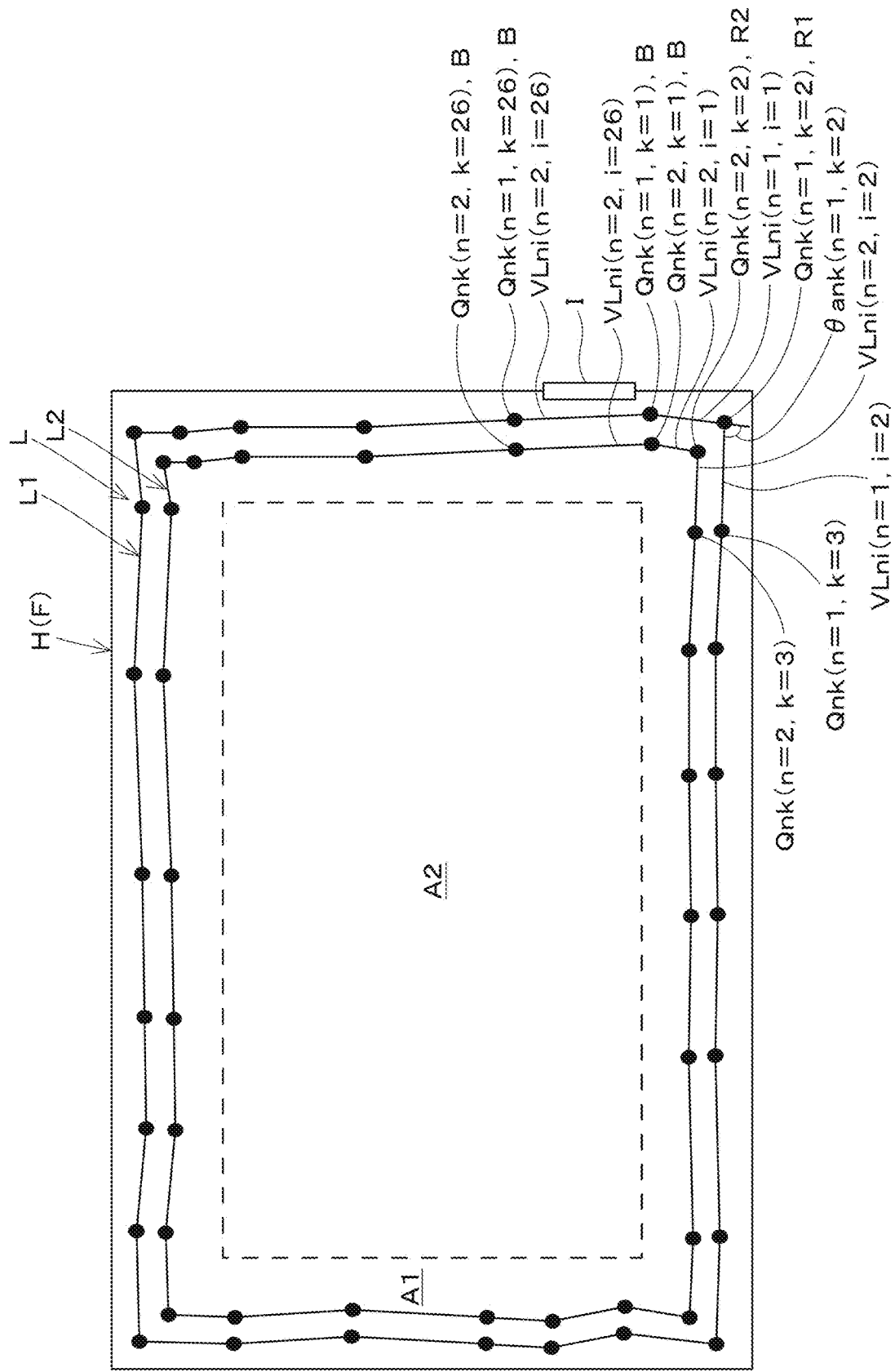
FIG. 9A is a first diagram for explaining setting of a work point.

As illustrated in FIG. 9A, the second generator 52f creates travel line(s) L which passes through the plurality of creation points Qnk generated by the first generator 52e and along which the agricultural machine 1 makes a round, and calculates each of a plurality of virtual lines VLni (n: headland number (loop number), n=1, 2, 3, . . . , n) (i: indicating a virtual line, i=1, 2, 3, . . . , i) by connecting together adjacent ones of the plurality of creation points Qnk on each travel line L. Specifically, first, the second generator 52f creates loop line(s) Ln passing through creation points Qnk, for the respective headland(s). That is, if the number of headlands is four, the second generator 52f creates loop lines Ln (the first loop line L1 to the fourth loop line L4) each passing through corresponding ones of the first creation points Q1k to the fourth creation points Q4k. If the number of headlands is five, the second generator 52f creates loop lines Ln (the first loop line L1 to the fifth loop line L5) each passing through corresponding ones of the first creation points Q1k to the fifth creation points Q5k.

Next, the second generator 52f calculates a plurality of virtual lines VLni each connecting together adjacent ones of the plurality of creation points Qnk on each of the loop lines Ln. That is, each of the loop lines Ln includes a plurality of virtual lines VLni. The second generator 52f calculates a virtual line VLni (in the present preferred embodiment, i=k) connecting a creation point Qnk and its adjacent creation point Qnk+1. The adjacent creation point Qnk+1 mentioned here is the creation point adjacent to the creation point Qnk on the same headland number (the same loop).

For example, as illustrated in FIG. 9A, the second generator 52f calculates a virtual line VL11 connecting a creation point Q11 and its adjacent creation point Q12. Furthermore, the second generator 52f calculates a virtual line VL22 connecting a creation point Q22 and its adjacent creation point Q23.

In the present preferred embodiment, each virtual line VLni is a straight line connecting adjacent creation points Qnk to each other. However, it is sufficient as long as the virtual line VLni connects adjacent creation points Qnk to each other. The virtual line VLni may be an arbitrary curve.

The setter 52g extracts, from the plurality of virtual lines VLni generated by the second generator 52f, a pair of virtual lines VLni−1 and VLni adjacent to each other and extending in different directions, and sets the creation point Qnk (for example, k=i) that is shared by the extracted pair of virtual lines VLni−1 and VLni as a work point Rn regarding a breakpoint in work performed by the working device 2. FIG. 9A illustrates an example of a case where a work point Rn of the first loop line L1 (R1) and a work point Rn of the second loop line L2 (R2), among the loop lines Ln, are set. The work point Rn is a work start point, a work end point, a pause point, or a work preparation point of the working device 2. For example, the work point Rn is a point serving as a breakpoint in work when the agricultural machine 1 moves from a loop line Ln on which the agricultural machine 1 is currently located to the outside of the agricultural field H or to an adjacent loop line Ln. In the present preferred embodiment, an explanation will be given on the assumption that the work point Rn is the work start point. In this case, the work end point is a point at a position that is immediately preceding the work start point (the work point Rn) (position displaced from the work start point in the direction opposite to the direction of travel of the agricultural machine 1).

In a case where there are a plurality of such pairs of virtual lines VLni−1 and VLni, the setter 52g extracts a particular pair of virtual lines VLni−1 and VLni defining an angle not less than a criterion value from the plurality of pairs of virtual lines VLni−1 and VLni, and sets the creation point Qnk that is shared by the extracted predetermined pair of virtual lines VLni−1 and VLni as a candidate for the work point Rn (a first condition). The creation point Qnk shared by the pair of virtual lines VLni−1 and VLni mentioned here is the creation point Qnk common to "the creation point Qnk−1 and the creation point Qnk that are connected by the virtual line VLni−1" and "the creation point Qnk and the creation point Qnk+1 that are connected by the virtual line VLni". For example, as illustrated in FIG. 9A, the creation point Qnk shared by a pair of virtual lines VL11 and VL12 is a creation point Q12 common to "a creation point Q11 and the creation point Q12 that are connected by the virtual line VL11" and "the creation point Q12 and a creation point Q13 that are connected by the virtual line VL12".

In the present preferred embodiment, the criterion value is about 40°, for example. In a case where there are a plurality of such pairs of virtual lines VLni−1 and VLni, the setter 52g checks whether or not an external angle θank (n: headland number (loop number), n=1, 2, 3, . . . , n) (k: indicating a creation point, k=1, 2, 3, . . . , k) defined by each pair of virtual lines VLni−1 and VLni is not less than a predetermined criterion value, extracts a particular pair of virtual lines VLni−1 and VLni whose external angle θank is not less than about 40°, and sets the creation point Qnk that is shared by the extracted particular pair of virtual lines VLni−1 and VLni as a candidate for the work point Rn. In the example illustrated in FIG. 9A, an external angle θa12 defined by a pair of virtual lines VL11 and VL12 is not less than about 40°, and the creation point shared by them is set as a candidate for the work point Rn. Though the criterion value is about 40° in the present preferred embodiment, the criterion value may be within a range from about 20° to about 60°, and is not limited to the value mentioned above.

Figure 9B:
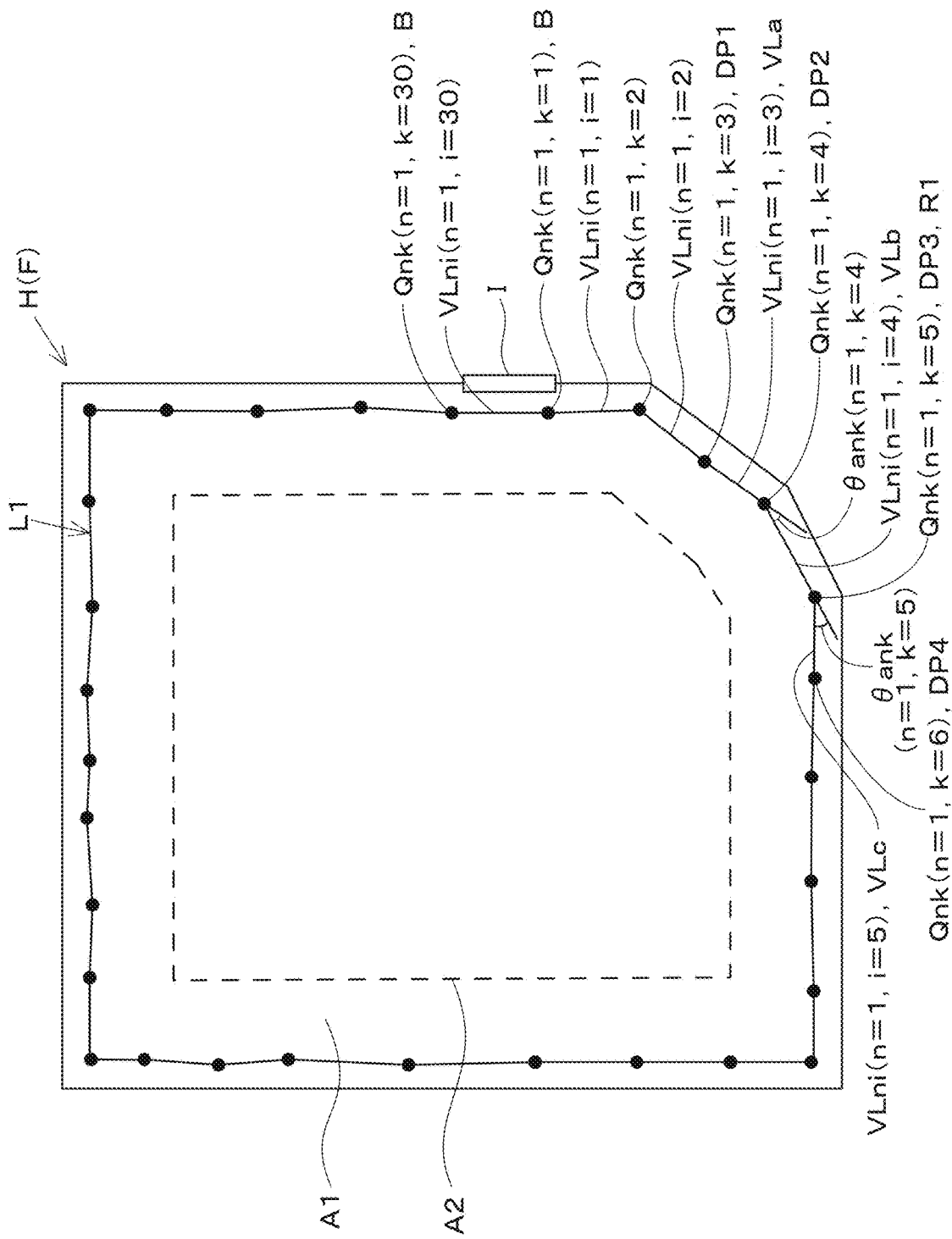
FIG. 9B is a second diagram for explaining setting of a work point.

In addition to the candidate(s) for the work point Rn satisfying the first condition described above, the setter 52g sets, as candidate(s) for the work point Rn, creation point(s) Qnk satisfying a predetermined condition (a second condition). FIG. 9B illustrates an example of a case where the work point R1 of the first loop line L1, among the loop lines Ln in afield F different from that of FIG. 9A, is set. Specifically, assume that, among a plurality of virtual lines VLni connecting four adjacent creation points Qnk (a first adjacent point DP1 to a fourth adjacent point DP4 counted in order clockwise or counterclockwise from a predetermined position on a loop line Ln), the virtual line VLni connecting the first adjacent point DP1 and the second adjacent point DP2 to each other is defined as a first virtual line VLa, the virtual line VLni connecting the second adjacent point DP2 and the third adjacent point DP3 to each other is defined as a second virtual line VLb, and the virtual line VLni connecting the third adjacent point DP3 and the fourth adjacent point DP4 to each other is defined as a third virtual line VLc. In this case, the setter 52g sets the third adjacent point DP3 as a candidate for the work point Rn if the sum of an external angle θank defined by the first virtual line VLa and the second virtual line VLb and an external angle θank+1 defined by the second virtual line VLb and the third virtual line VLc is not less than a criterion value (for example, about 40°) and if the length of the first virtual line VLa to the third virtual line VLc is less than a predetermined length (for example, about 10 m).

In the example illustrated in FIG. 9B, the setter 52g sets the third adjacent point DP3 (Q15) as a candidate for the work point Rn because the sum of an external angle θa14 defined by the first virtual line VLa (VL13) and the second virtual line VLb (VL14) and an external angle θa15 defined by the second virtual line VLb (VL14) and the third virtual line VLc (VL15) is not less than about 40° and the length of the first virtual line VLa to the third virtual line VLc is less than about 10 m.

Furthermore, in a case where there are a plurality of candidates for the work point Rn, the setter 52g extracts a particular pair of virtual lines VLni−1 and VLni defining an internal angle θbnk (k: indicating a creation point, k=1, 2, 3, . . . , k) less than about 180° from a plurality of the extracted pairs of virtual lines VLni−1 and VLni, and sets the creation point Qnk shared by the extracted particular pair of virtual lines VLni−1 and VLni as a candidate for the work point Rn (a third condition). In other words, the setter 52g excludes, from the candidates for the work point Rn, the creation point(s) Qnk shared by a pair of virtual lines VLni−1 and VLni defining an internal angle θbnk not less than about 180° (n: headland number (loop number), n=1, 2, 3, . . . , n, k=1, 2, 3, . . . , k), among the plurality of pairs of virtual lines VLni−1 and VLni having been extracted.

Figure 9C:
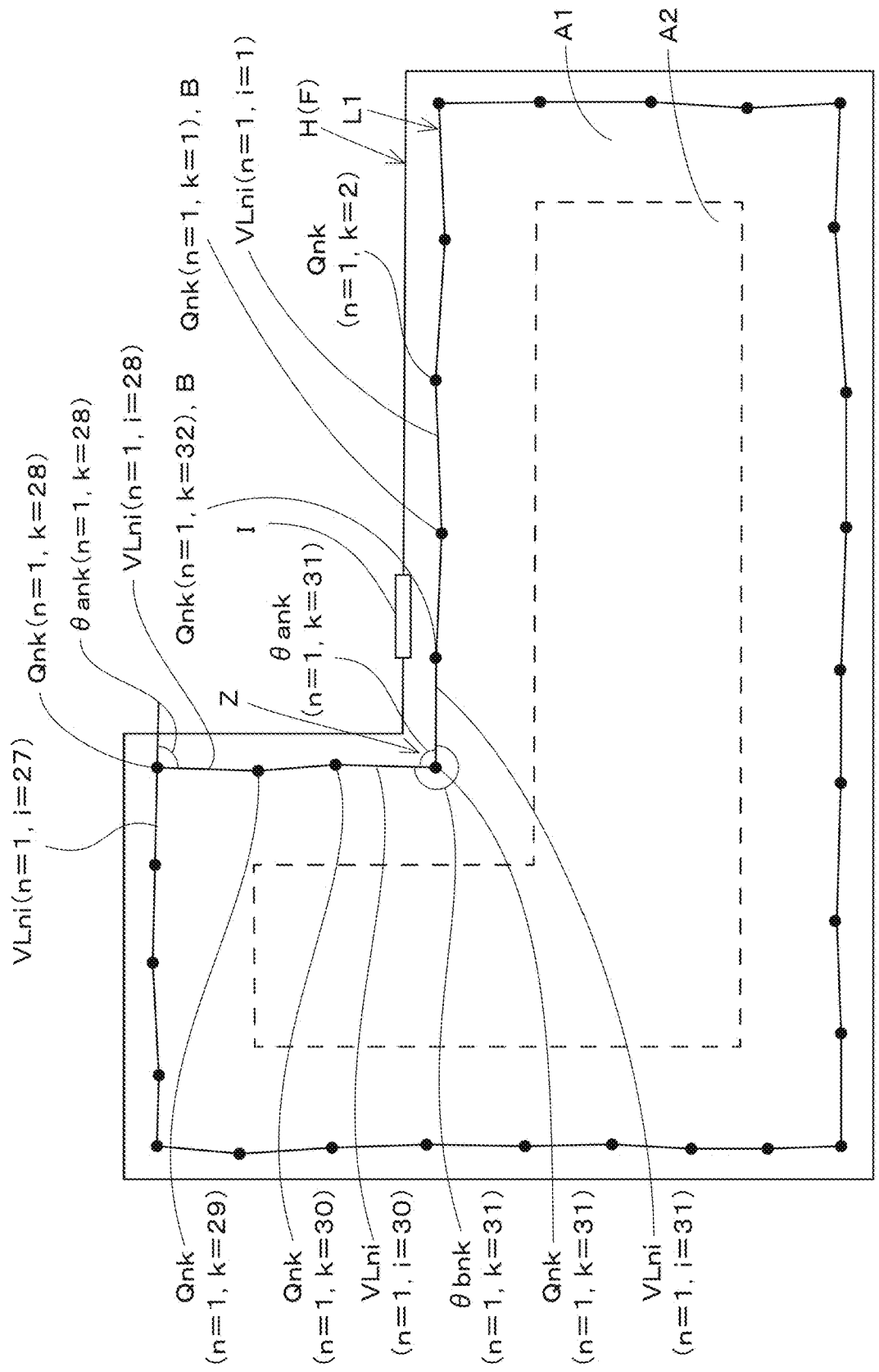
FIG. 9C is a third diagram for explaining setting of a work point.

FIG. 9C illustrates an example of a case where the work point R1 of the first loop line L1, among the loop lines Ln in a field F different from those of FIGS. 9A and 9B, is set. As illustrated in FIG. 9C, in a case where a loop line Ln is shaped such that the outline of the loop line Ln at least partially includes a recessed portion Z, even if a creation point Qnk at the recessed portion Z satisfies the first condition or the second condition, the setter 52g excludes this creation point from the candidate(s) for the work point Rn, in accordance with the third condition. In the example illustrated in FIG. 9C, an internal angle θb131 defined by a pair of virtual lines VL130 and VL131 at the recessed portion Z is about 270°, which is not less than about 180°. Therefore, a creation point Q131, which is shared by the pair of virtual lines VL130 and VL131, is excluded from the candidate(s) for the work point Rn.

The setter 52g performs a search for candidates for the work point Rn with on the basis of a creation point Qnk in the vicinity of the entrance/exit I of the agricultural field H (such a creation point Qnk is a reference point B). The reference point B is the creation point Qnk created based on the position measurement point Pk of the entrance/exit I of the agricultural field H. The setter 52g performs a search to check whether the above-described conditions for the candidates for the work point Rn (the first condition and the third condition, or the second condition and the third condition) are satisfied or not, sequentially for the creation points Qnk from the reference point B, both clockwise and counterclockwise from the reference point B. Specifically, the setter 52g performs a search for candidates for the work point Rn within a range in which the distance from the reference point B is less than one-fifth of the entire length of a loop line Ln. That is, the setter 52g performs a search both in the clockwise direction and the counterclockwise direction from the reference point B, and sets, in each of these directions, the creation point Qnk that is nearest to the reference point B and that satisfies the conditions for candidates for the work point Rn (the first condition and the third condition, or the second condition and the third condition) as the candidates for the work point Rn.

Though the setter 52g performs a search for candidates for the work point Rn within a range in which the distance from the reference point B is less than about one-fifth of the entire length of the loop line Ln in the present preferred embodiment, the range within which the setter 52g performs a search may be a range in which the distance from the reference point B is less than about one-seventh to about one-third of the entire length of the loop line Ln, and is not limited to the range described above.

If there are a plurality of candidates for the work point Rn within the range on the clockwise side and the range on the counterclockwise side of the reference point B, the setter 52g sets the candidate that is nearest to the entrance/exit of the agricultural field H as the work point Rn among the plurality of candidates. If there are no candidates for the work point Rn within the range on the clockwise side or the range on the counterclockwise of the reference point B, the setter 52g sets the reference point B as the work point Rn. This is described with reference to FIG. 10 as an example. Since creation points Qnk for respective loop lines Ln are located at different positions in the direction in which the paths of the loop lines Ln extend, the work points Rn are set for the respective paths at different positions in the direction in which the paths extend.

Figure 10:
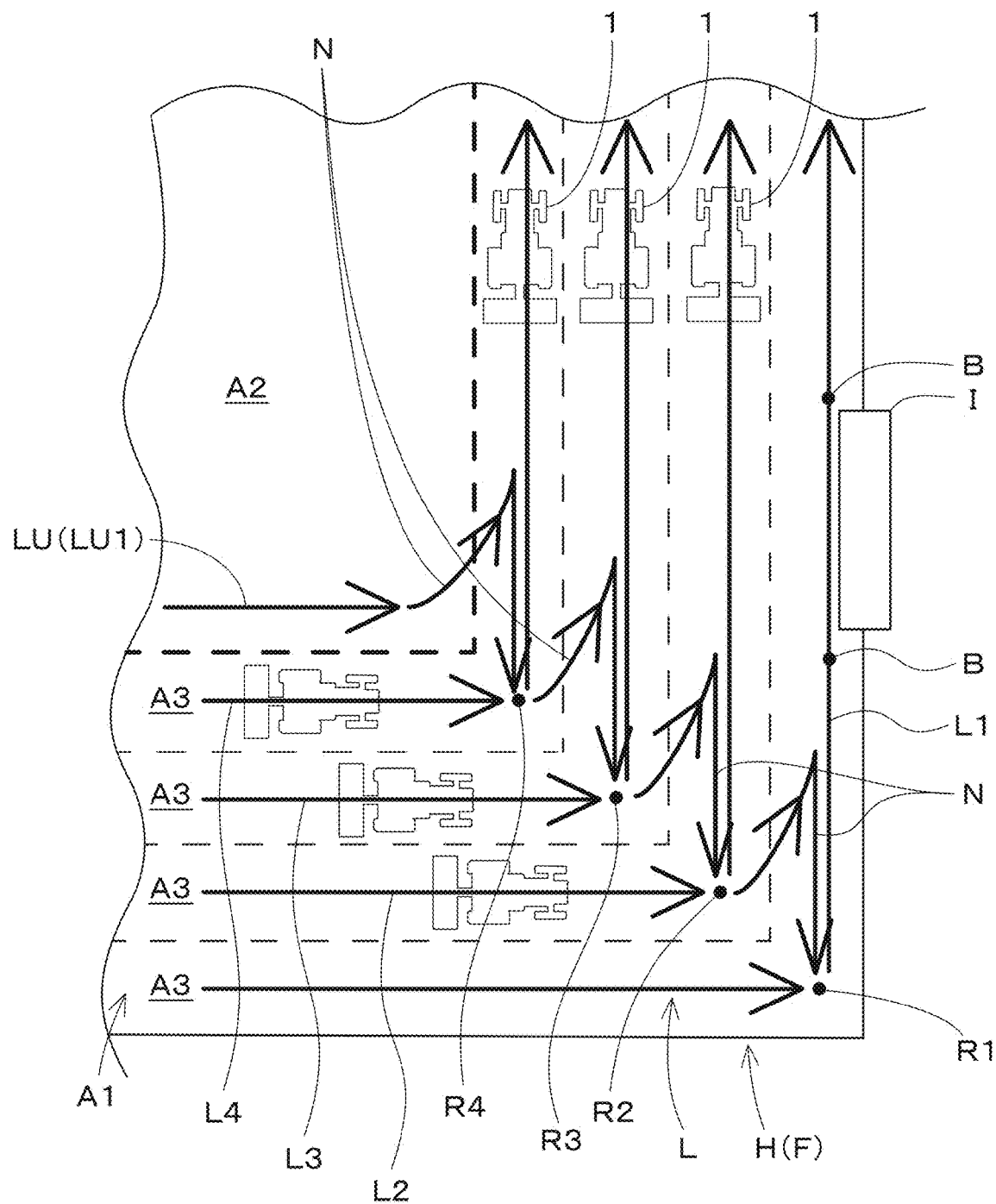
FIG. 10 is a diagram for explaining move lines and a path traveled by the agricultural machine.

Based on the work points Rn set by the setter 52g, as illustrated in FIG. 10, the third generator 52h creates move lines N each connecting one loop line Ln and its adjacent loop line Ln and a move line N connecting a loop line Ln and the inner line LU. Each move line N is a portion of the travel line(s) L. For example, in the case where the agricultural machine 1 moves from an inner loop line Ln to an outer loop line Ln, the move line N is a line that connects a position that immediately precedes the work point Rn of the inner loop line Ln (such a position is a work end point) to the work point Rn (work start point) of the outer loop line Ln. For example, the agricultural machine 1 makes a turn to move to the outer loop line Ln from the work end point, and then moves backward to the work start point P3n. In the case where the agricultural machine 1 moves to the outside of the agricultural field H from the outermost loop line Ln, the move line N is a line that connects a position that immediately precedes the work point P3n (work start point) of the outermost loop line Ln (such a position is a work end point) to the entrance/exit I of the agricultural field H. For example, the agricultural machine 1 moves to the entrance/exit I of the agricultural field H by making a turn from the work end point.

Though the agricultural machine 1 travels along the travel line(s) L automatically in the present preferred embodiment, the agricultural machine 1 may travel along the move lines N automatically in a case of being manually operated to travel along the loop line(s) Ln and the inner line LU of the travel lines L.

It is sufficient as long as the agricultural machine 1 is capable of moving from the inner line LU to the innermost loop line Ln, from an inner loop line Ln to an outer loop line Ln, and from the outermost loop line Ln to the outside of the agricultural field H while avoiding traveling a place where work has already been performed. The route of the move lines N is not limited to the example described above.

Figure 11:
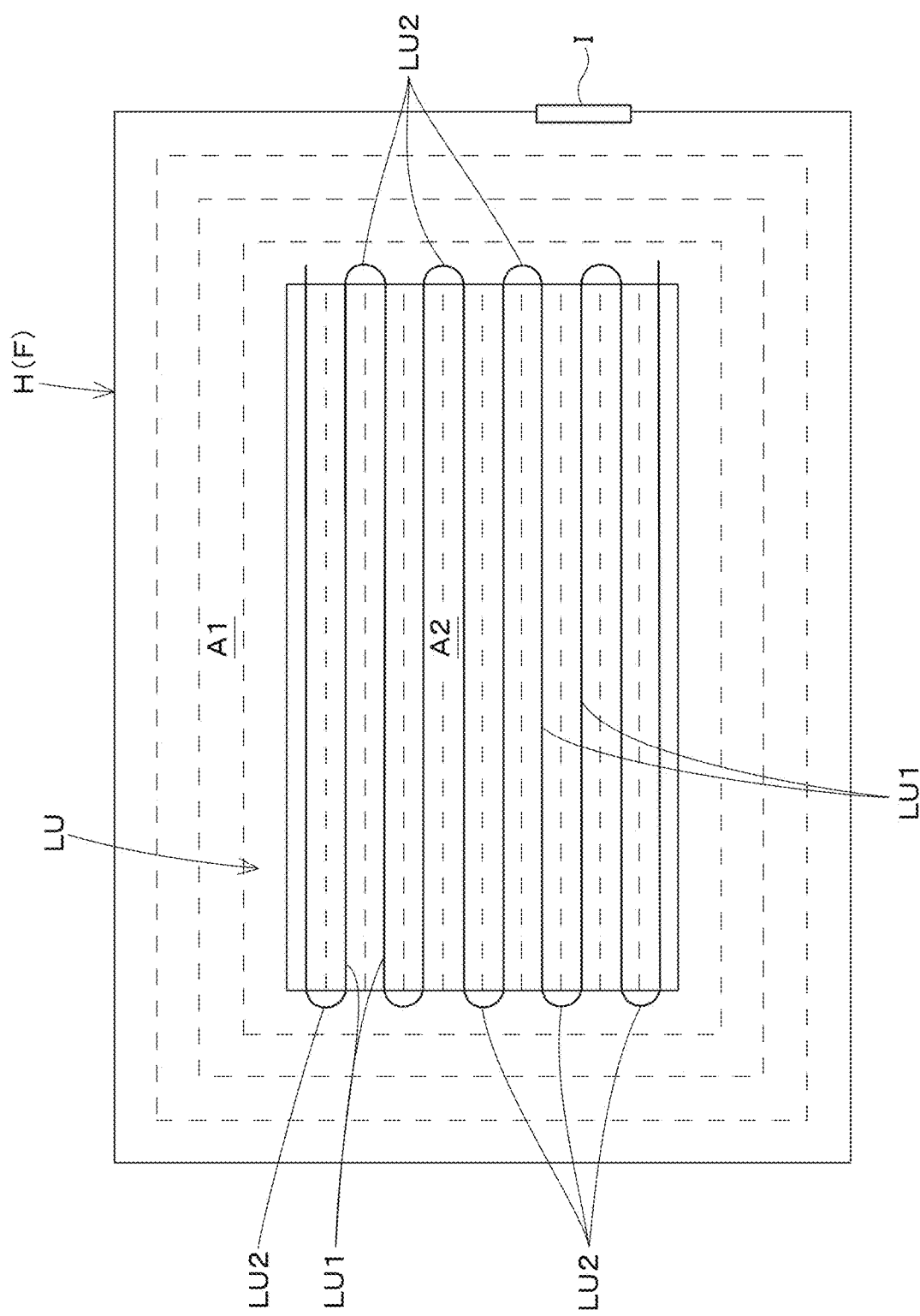
FIG. 11 is a diagram for explaining an inner line.

As illustrated in FIG. 11, the fourth generator 52i creates the inner line LU in an area (the inner area A2) inward of the headland. Based on the work point Rn of the innermost loop line Ln among the work points Rn set by the setter 52g, the fourth generator 52i creates the inner line LU. Specifically, as illustrated in FIG. 11, the fourth generator 52i sets straight portion(s) LU1, of the inner line LU, each of which connects opposite ends in the longitudinal direction. The fourth generator 52i sets the straight portion LU1 that has at least one end (termination end) coincides with the work point Rn of the innermost loop line Ln. In addition, the fourth generator 52i creates turning portion(s) LU2 each connecting adjacent straight portions LU1 in the headland area A1.

The travel line(s) L set in the inner area A2 and the headland area A1 by the first generator 52e, the second generator 52f, the third generator 52h, and the fourth generator 52i is/are stored into the memory 53. At least the loop line(s) Ln of the travel line(s) L set by the first generator 52e, the second generator 52f, the third generator 52h, and the fourth generator 52i is/are displayed on the route display section 114 of the setting screen M2. In the present preferred embodiment, as illustrated in FIG. 7, the loop line(s) Ln and the straight portion(s) LU1 of the travel line(s) L set by the first generator 52e, the second generator 52f, the third generator 52h, and the fourth generator 52i are displayed in the route display section 114 of the setting screen M2. Note that the direction in which the agricultural machine 1 travels along the travel line(s) L (the loop line(s) Ln) is set based on the direction from the work point Rn toward the entrance/exit I.

For example, the following description is given with reference to FIG. 10 as an example. Since each work point Rn is located lower than the entrance/exit I in FIG. 10, the direction from the work point Rn toward the entrance/exit I is an upward direction in FIG. 10. Therefore, the direction of travel of the agricultural machine 1 is set to be counterclockwise along the loop lines Ln. In addition, on the route display section 114, the point where the agricultural machine 1 starts work in the agricultural field H, that is, the work start point in the inner area A2, is represented by a first icon 114a, and the point where the agricultural machine 1 ends work in the agricultural field H, that is, the work point Rn of the first loop line L1, is represented by a second icon 114b.

Figure 12A:
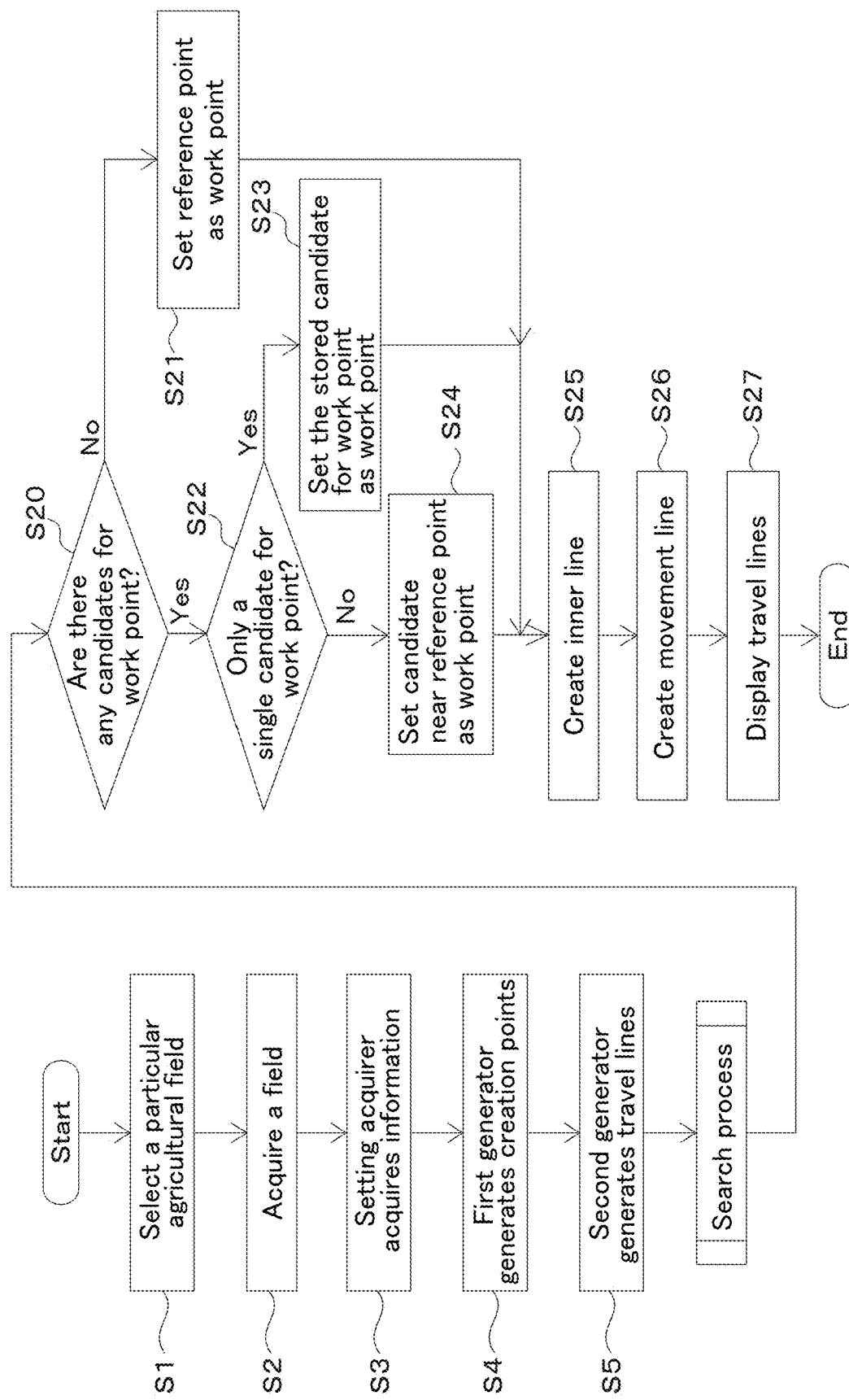
FIG. 12A is a flowchart showing steps performed by a travel line creation system.
Figure 12B:
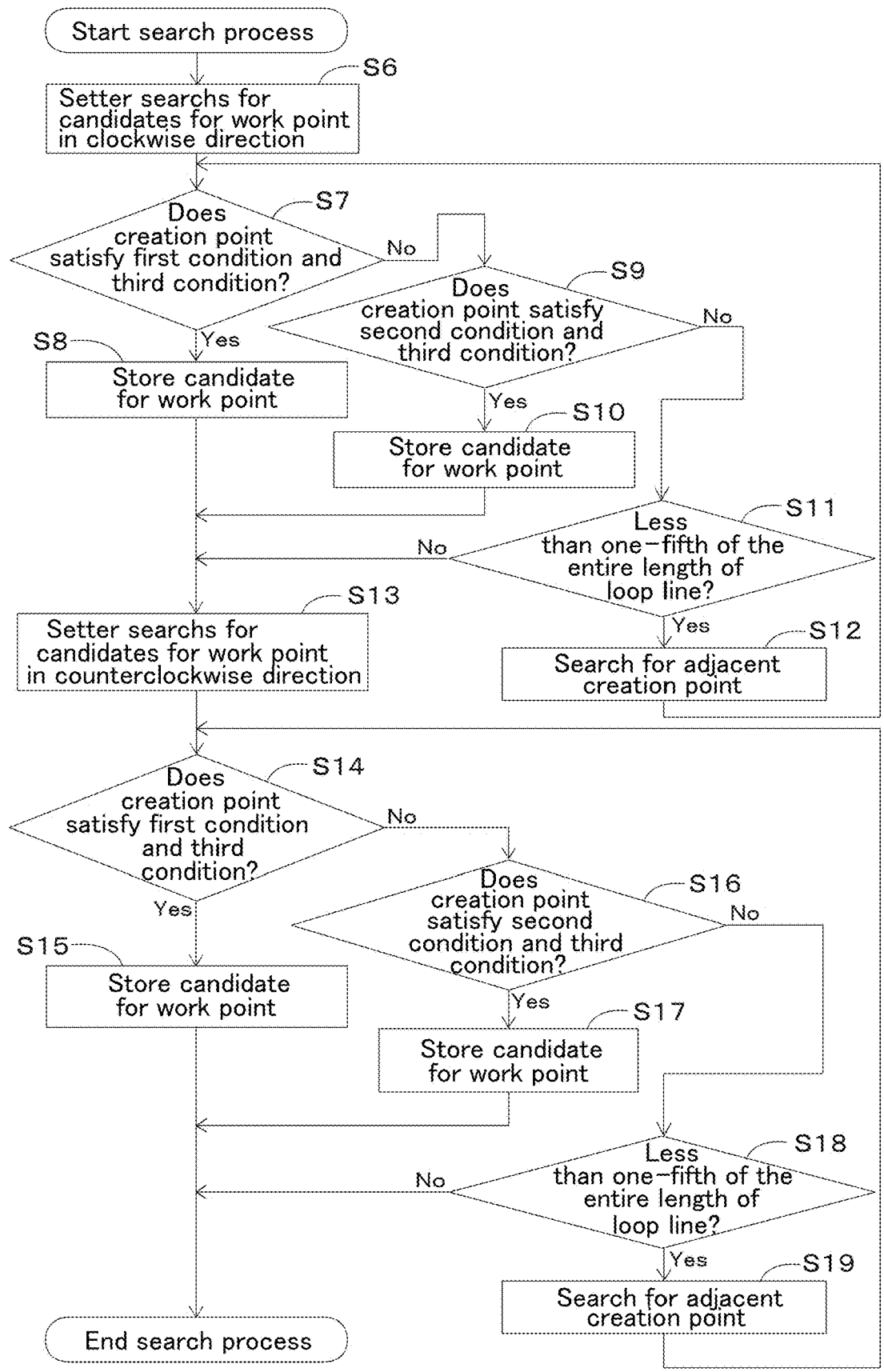
FIG. 12B is a flowchart showing a search process performed by the travel line creation system.

FIGS. 12A and 12B are flowcharts showing steps performed by the travel line creation system S for the agricultural machine 1. The following description discusses the creation of travel line(s) L based on the assumption that the registration of the agricultural field H has already been done.

As illustrated in FIG. 12A, when the operator operates the display 50 to select a particular agricultural field H from a plurality of agricultural fields H having been registered (S1), the field acquirer 52c acquires the field F that represents the particular agricultural field H from the memory 53 (S2).

Upon the acquisition of the field F by the field acquirer 52c (S2), the setting acquirer 52d acquires information inputted on the display 50 (for example, the number of headlands, the work width W1, the first overlap width W2, and/or the second overlap width W3 (S3). Upon the acquisition of the inputted information by the setting acquirer 52d (S3), based on the position measurement points Pk acquired by the position acquirer 52a, the first generator 52e generates creation points Qnk (S4). Specifically, if the number of headlands is two or more, the first generator 52e first creates creation points Qnk through which the outermost loop line Ln passes and then creates creation points Qnk through which inner loop lines Ln pass.

As illustrated in FIG. 12A, upon the generation of the creation points Qnk by the first generator 52e (S4), the second generator 52f creates travel line(s) L including a loop (loop line(s) Ln), and calculates virtual lines VLni (S5). For example, the second generator 52f first creates a loop line Ln passing through the outermost creation points Qnk, and then creates loop lines Ln passing through their corresponding inner creation points Qnk sequentially. In this case, the second generator 52f calculates a plurality of virtual lines VLni by connecting together adjacent ones of the plurality of creation points Qnk on the travel lines L.

After the calculation of the plurality of virtual lines VLni by the second generator 52f (S5), the processing proceeds to a phase in which, as illustrated in FIG. 12B, for example, the setter 52g sets work points Rn sequentially on loop lines Ln from the outermost loop line Ln inward (search process). In the search process, the setter 52g starts a search for the candidate for the work point Rn that is nearest from the reference point B clockwise from the reference point B (S6), and, after the end of this search, starts a search for the candidate for the work point Rn that is nearest from the reference point B counterclockwise from the reference point B (S13). Though the setter 52g performs the counterclockwise search for the work point Rn after performing the clockwise search for the work point Rn in the present preferred embodiment, the order may be reversed.

In the search for candidates for the work point Rn, the setter 52g determines whether the first condition and the third condition are satisfied or not, sequentially clockwise from the creation point Qnk that is nearest to the reference point B (S7). If the creation point Qnk satisfies the first condition and the third condition (S7: Yes), the setter 52g stores this creation point Qnk as a candidate for the work point Rn (S8).

If the creation point Qnk does not satisfy the first condition and the third condition (S7: No), the setter 52g determines whether this creation point Qnk satisfies the second condition and the third condition or not (S9). If the creation point Qnk satisfies the second condition and the third condition (S9: Yes), the setter 52g stores this creation point Qnk as a candidate for the work point Rn (S10).

If the creation point Qnk does not satisfy the second condition and the third condition (S9: No), the setter 52g determines whether the distance, from the reference point B, of the creation point Qnk for which the determination regarding the first to third conditions has been performed is less than one-fifth of the entire length of the loop line Ln or not (S11).

If the distance of the creation point Qnk from the reference point B is less than one-fifth of the entire length of the loop line Ln (S11: Yes), the setter 52g performs a search for a creation point Qnk that is clockwise adjacent to this creation point Qnk (S12).

In a case where the creation point(s) Qnk is stored as a candidate for the work point Rn (S8, S10), and in a case where the distance of the creation point Qnk from the reference point B is not less than one-fifth of the entire length of the loop line Ln (S11: No), the setter 52g starts a search for the candidate for the work point Rn that is nearest from the reference point B counterclockwise from the reference point B (S13).

In the search for candidates for the work point Rn, the setter 52g determines whether the first condition and the third condition are satisfied or not, sequentially counterclockwise from the creation point Qnk that is nearest to the reference point B (S14). If the creation point Qnk satisfies the first condition and the third condition (S14: Yes), the setter 52g stores this creation point Qnk as a candidate for the work point Rn (S15).

If the creation point Qnk does not satisfy the first condition and the third condition (S14: No), the setter 52g determines whether this creation point Qnk satisfies the second condition and the third condition or not (S16). If the creation point Qnk satisfies the second condition and the third condition (S16: Yes), the setter 52g stores this creation point Qnk as a candidate for the work point Rn (S17).

If the creation point Qnk does not satisfy the second condition and the third condition (S16: No), the setter 52g determines whether the distance, from the reference point B, of the creation point Qnk for which the determination regarding the first to third conditions has been performed is less than one-fifth of the entire length of the loop line Ln or not (S18). If the distance of the creation point Qnk from the reference point B is within a range of about one-fifth of the entire length of the loop line Ln (S18: Yes), the setter 52g performs a search for a creation point Qnk that is counterclockwise adjacent to this creation point Qnk (S19).

In a case where the creation point(s) Qnk is stored as a candidate for the work point Rn (S15, S17), and in a case where the distance of the creation point Qnk from the reference point B is not less than about one-fifth of the entire length of the loop line Ln (S18: No), the setter 52g terminates the search process and checks whether there are any stored candidates for the work point Rn or not (S20) as illustrated in FIG. 12A.

If there are no stored candidates for the work point Rn (S20; No), the setter 52g sets the reference point B as the work point Rn (S21). If there are any stored candidate(s) for the work point Rn (S20; Yes), the setter 52g checks whether only a single candidate for the work point Rn is stored (S22).

If only a single candidate for the work point Rn is stored (S22; Yes), the setter 52g sets this single candidate for the work point Rn as the work point Rn (S23). On the other hand, if there are a plurality of (two) stored candidates for the work point Rn (S22: No), the setter 52g sets one of the two candidates for the work point Rn that is nearer to the reference point B as the work point Rn (S24).

Upon the setting of the work point Rn by the setter 52g (S21, S22, S23), the fourth generator 52i creates an inner line LU in an area (inner area A2) located inward of the headland (S25). Upon the creation of the inner line LU by the fourth generator 52i, based on the set work point(s) Rn, the third generator 52h creates move lines N each connecting one loop line Ln and its adjacent loop line Ln and a move line N connecting another loop line Ln and the inner line LU (S26). Upon the creation of the move lines N by the third generator 52h (S26), the travel lines L including the created loop line(s) Ln, the created move lines N, and the created inner line LU are displayed on the route display section 114 of the setting screen M2 (S27).

A travel line creation system S for an agricultural machine 1 as has been discussed includes a position acquirer 52a to acquire position measurement points Pk obtained when the agricultural machine 1 to which a working device 2 is attachable makes a round in an agricultural field H, a display 50 to display a field F that represents the agricultural field H, a first generator 52e to associate the position measurement points Pk with the field F displayed by the display 50 and generate creation points Qnk on the field F by shifting the position measurement points Pk inward in the agricultural field H, a second generator 52f to create a travel line L including a loop which passes through the creation points Qnk generated by the first generator 52e and calculate each of virtual lines VLni by connecting together adjacent ones of the creation points Qnk on the travel line L, and a setter 52g to extract, from the virtual lines VLni generated by the second generator 52f, a pair of virtual lines VLni−1, VLni adjacent to each other and extending in different directions and set, as a work point Rn regarding a breakpoint in work performed by the working device 2, one of the creation points Qnk that is shared by the extracted pair of virtual lines VLni−1, VLni. With this configuration, the agricultural machine 1 performs an operation regarding a breakpoint in work at a bent or curved portion of the travel line L that extends in different directions. Therefore, when the agricultural machine 1 moves to the outside of the agricultural field H, the agricultural machine 1 is able to leave the travel line L of the work region while avoiding traveling on the place where the working device 2 has already performed work.

If there are a plurality of the pairs of virtual lines VLni−1, VLni, the setter 52g may extract a particular pair of virtual lines VLni−1, VLni defining an angle not less than a criterion value from the plurality of pairs of virtual lines VLni−1, VLni, and set, as the work point Rn, one of the creation points Qnk that is shared by the extracted particular pair of virtual lines VLni−1, VLni. With this configuration, it is possible to exclude pair(s) of virtual lines VLni−1 and VLni each defining a line relatively close to a straight line, from pair(s) of virtual lines VLni−1 and VLni that is/are candidate(s) for the work point Rn. Therefore, when the agricultural machine 1 moves to the outside of the agricultural field H, the agricultural machine 1 is capable of putting an end to work at a position where the angle is relatively large and leaving the travel line L while avoiding traveling on the place where work has already been performed.

If there are candidates for the work point Rn, the setter 52g may extract a particular pair of virtual lines VLni−1, VLni defining an internal angle θbnk less than 180° from a plurality of the extracted pairs of virtual lines VLni−1, VLni, and set, as the work point Rn, one of the creation points Qnk that is shared by the extracted particular pair of virtual lines VLni−1, VLni. With this configuration, even in a case where a portion of the travel line L is recessed, it is possible to exclude the recessed portion from candidates for the work point Rn. Therefore, when the agricultural machine 1 moves to the outside of the agricultural field H, the agricultural machine 1 is capable of putting an end to work at a position protruding outward on the perimeter of the agricultural field H and leaving the travel line L, and therefore it is possible to avoid traveling on the place where work has already been performed.

If there are candidates for the work point Rn, the setter 52g may set, as the work point Rn, one of the candidates that is nearest to an entrance-and-exit of the agricultural field H. With this configuration, the agricultural machine 1 is capable of moving to the outside of the agricultural field H or to another place or the like from the travel line L efficiently by traveling a relatively short distance.

The second generator 52f may set, as the travel line L, a headland work line Ln to performing work on a headland of the agricultural field H. With this configuration, when the agricultural machine 1 performs work on an area located inward of the headland and performs work on the headland while making a round on the headland, it is possible to increase efficiency of the work on the headland and efficiency of the movement from the headland work line Ln to the outside of the agricultural field H.

The setter may set a work start point, a work end point, a pause point, or a work preparation point of the working device 2 as the work point Rn. With this configuration, it is possible to leave the travel line L while avoiding, to a greater extent, traveling on the place where work has already been performed.

The second generator 52f may generate, as a plurality of the travel lines L, paths adjacent to each other in a direction from a central portion of the field F outward. The setter 52g may set, respectively for the paths adjacent to each other, a plurality of the work points Rn at different positions in a direction in which the paths extend. With the configuration, when the agricultural machine moves from one travel line L to its adjacent travel line L, the agricultural machine moves to a position displaced along the direction of extension of the travel lines L, thus making it possible to avoid, to a greater extent, traveling on the place where work has already been performed.

An agricultural machine 1 includes the travel line creation system S for an agricultural machine 1 described above. This configuration makes it possible to provide an agricultural machine 1 that achieves the advantageous effect(s) described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A travel line creation system for an agricultural machine, the travel line creation system comprising:
   a position acquirer to acquire position measurement points obtained when the agricultural machine to which a working device is attachable makes a round in an agricultural field;
   a display to display a field that represents the agricultural field;
   a first generator to:
      associate the position measurement points with the field displayed by the display; and
      generate creation points on the field by shifting the position measurement points inward in the agricultural field;
   a second generator to:
      create a travel line including a loop which passes through the creation points generated by the first generator; and
      calculate each of virtual lines by connecting together adjacent ones of the creation points on the travel line; and
   a setter to:
      extract, from the virtual lines generated by the second generator, a pair of virtual lines adjacent to each other and extending in different directions; and
      set one of the creation points that is shared by the extracted pair of virtual lines as a work point regarding a breakpoint in work when the agricultural machine moves from the travel line including a loop to an outside of the agricultural field or to another travel line including a loop.

2. The travel line creation system according to claim 1, wherein
   the setter is operable to, when there are a plurality of the pairs of virtual lines, extract a particular pair of virtual lines defining an angle not less than a criterion value from the plurality of pairs of virtual lines, and set, as the work point, one of the creation points that is shared by the extracted particular pair of virtual lines.

3. The travel line creation system according to claim 2, wherein
   the setter is operable to, when there are candidates for the work point, extract a particular pair of virtual lines defining an internal angle less than 180° from a plurality of the extracted pairs of virtual lines, and set, as the work point, one of the creation points that is shared by the extracted particular pair of virtual lines.

4. The travel line creation system according to claim 1, wherein
   the setter is operable to, when there are candidates for the work point, set, as the work point, one of the candidates that is nearest to an entrance-and-exit of the agricultural field.

5. The travel line creation system according to claim 1, wherein the second generator is operable to set, as the travel line, a headland work line to perform work on a headland of the agricultural field.

6. The travel line creation system according to claim 1, wherein the setter is operable to set a work start point, a work end point, a pause point, or a work preparation point of the working device as the work point.

7. The travel line creation system according to claim 1, wherein
- the second generator is operable to generate, as a plurality of the travel lines, paths adjacent to each other in a direction from a central portion of the field outward; and
- the setter is operable to set, respectively for the paths adjacent to each other, a plurality of the work points at different positions in a direction in which the paths extend.

8. An agricultural machine, comprising:
the travel line creation system according to claim 1.

9. The travel line creation system according to claim 1, wherein the travel line including a loop is a continuous loop path.

* * * * *